US007945777B2

(12) United States Patent
Tando et al.

(10) Patent No.: US 7,945,777 B2
(45) Date of Patent: *May 17, 2011

(54) IDENTIFICATION INFORMATION PROTECTION METHOD IN WLAN INTER-WORKING

(75) Inventors: Pel Yew Tando, Singapore (SG); Hong Cheng, Singapore (SG); Toyoki Ue, Yokohama (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,487

(22) Filed: Aug. 17, 2009

(65) Prior Publication Data

US 2009/0319774 A1 Dec. 24, 2009

Related U.S. Application Data

(63) Continuation of application No. 10/530,404, filed on Apr. 7, 2005, now Pat. No. 7,594,113.

(51) Int. Cl.
*G06F 21/00* (2006.01)
*G06F 15/16* (2006.01)
*H04L 9/32* (2006.01)

(52) U.S. Cl. ............... 713/169; 713/182; 726/5; 726/14
(58) Field of Classification Search ........................ None
See application file for complete search history.

(56) References Cited

U.S. PATENT DOCUMENTS

| 6,260,147 | B1 | 7/2001 | Quick, Jr. |
| 6,785,823 | B1 | 8/2004 | Abrol |
| 6,904,466 | B1 | 6/2005 | Ishiyama |
| 6,911,974 | B2 * | 6/2005 | Asano et al. ................... 345/204 |
| 7,042,988 | B2 | 5/2006 | Juitt |
| 7,088,822 | B2 * | 8/2006 | Asano ............................. 380/45 |
| 7,224,804 | B2 * | 5/2007 | Ishiguro et al. ............... 380/279 |
| 7,594,113 | B2 * | 9/2009 | Tan et al. ....................... 713/169 |
| 2002/0004898 | A1 | 1/2002 | Droge |
| 2005/0289643 | A1 | 12/2005 | Sato |
| 2006/0235796 | A1 | 10/2006 | Johnson |

(Continued)

FOREIGN PATENT DOCUMENTS

EP 0982958 1/2000

(Continued)

OTHER PUBLICATIONS

"3rd Generation Partnership Project; Technical Specification Group Services and System Aspects; Feasibility Study on 3GPP System to Wireless Local Area Network (WLAN) Interworking (Release 6)," 3GPP TR 22.934 v1.0.0, Technical Report, http://www.3gpp.org, Valbonne, France, pp. 1, 3-15, Feb. 2002.

(Continued)

*Primary Examiner* — Christopher A Revak
(74) *Attorney, Agent, or Firm* — Dickinson Wright PLLC

(57) ABSTRACT

By introducing a hierarchical encryption scheme and the use of asymmetric cryptography, the critical information in message exchanges is concealed from unauthorized entities. This helps greatly in preventing man-in-the-middle attacks faced by inter-working. In addition, access control is conducted by introducing a network structure having a rule interpreter that is capable of mapping general rules to WLAN specific commands. It obviates the needs for mobile user's home network to understand information about every WLAN it is inter-worked with. A common interface independent of WLAN technologies could be used by the home network for all the WLANs. The above conception provides a solution to the problems of the protection of user identification information and access control in the inter-working of WLAN.

12 Claims, 12 Drawing Sheets

U.S. PATENT DOCUMENTS

| | | |
|---|---|---|
| 2007/0107047 A1 | 5/2007 | Mukherjee |
| 2008/0123850 A1 | 5/2008 | Bhatnagar |
| 2008/0260149 A1 | 10/2008 | Gehrmann |

FOREIGN PATENT DOCUMENTS

| | | | |
|---|---|---|---|
| EP | 1282262 A 1 | * | 3/2002 |
| JP | 10-126406 | | 5/1998 |
| JP | 11-203222 | | 7/1999 |
| JP | 2000-115161 | | 4/2000 |
| JP | 2000-332825 | | 11/2000 |
| JP | 2001-111543 | | 4/2001 |
| WO | 0126322 | | 4/2001 |
| WO | WO 2007/051776 A1 | * | 5/2007 |

OTHER PUBLICATIONS

C. Perkins, "IP Mobility Support for IPv4," Network Working Group, RFC 3220, Nokia Research Center, pp. 1-98, Jan. 2002.

"3$^{rd}$ Generation Partnership Project; Technical Specification Group Services and System Aspects; 3GPP system to Wireless Local Area Network (WLAN) Interworking; Functional and architectural definition (Release 6)," 3GPP TR 23.934 v0.3.0, Technical Report, http://www.3gpp.org, Helsinki, Finland, pp. 1-31, Jun. 2002.

"IEEE Standard for Local and metropolitan area networks: Port-Based Network Access Control", IEEE Std 802.1X-2001, http://www.ieee.org, pp. i-viii and 1-134.

Chinese Office Action dated Mar. 9, 2007 with English translation.

PCT International Search Report dated Jan. 27, 2004.

3GPP TR22.934 V1.0.0; 3rd Generation Partnership Technical Specification Group Services and Aspects; Feasibility Study on 3GPP System to Wireless Local Area Network (WLAN) Interworking; (Release 6); Feb. 2002, pp. 1-13.

Japanese Office Action, dated Feb. 16, 2010.

* cited by examiner

IDENTIFICATION INFORMATION PROTECTION METHOD IN WLAN INTER-WORKING This is a continuation application of application Ser. No. 10/530,404 filed Apr. 7, 2005, which is a national phase under 35 USC 371 of PCT/JP2003/013103 filed Oct. 14, 2003, which is a based on Japanese Patent Application No. 2002-299569 filed Oct. 11, 2002, the entire contents of each of which are incorporated by reference herein.

FIELD OF THE INVENTION

The present invention pertains to the field of wireless data communication, and more particularly, this invention relates to the provision of service in the wireless LAN (Wireless Local Area Network: WLAN) environment to the mobile user coming from other networks. The invention is used for the control of the access of the resource of the WLAN for the mobile users, in particular, the authentication, authorization, and accounting issues.

BACKGROUND ART

A wireless LAN is a flexible data communications system implemented as an extension to, or as an alternative for, a wired LAN. Using radio frequency (RF) technology, wireless LANs transmit and receive data over the air, minimizing the need for wired connections. By this means, wireless LANs combine data connectivity with user mobility. Wireless LANs have gained strong popularity in a number of vertical markets, including the health-care, retail, manufacturing, warehousing, and academia. These industries have profited from the productivity gains of using hand-held terminals and notebook computers to transmit real-time information to centralized hosts for processing. Today wireless LANs are becoming more widely recognized as a general-purpose connectivity alternative for a broad range of business customers.

Wireless LANs offer much higher access data rates than do cellular mobile networks, but provide limited coverage—typically up to 50 meters from the radio transmitter. While public networks, e.g. GSM/GPRS and WCDMA offer widespread—typically nationwide—coverage. In order to provide integrated service to the subscriber of both WLAN and public networks, the WLAN must inter-work with other WLANs or cellular mobile networks.

A few standardization groups have started the study on the WLAN and 3G network inter-working issues. In 3GPP [Non-patent document 1], a feasibility study report has been released. This document defined the scope for the inter-working, and also the usage scenarios. The inter-working scenarios are described in detail, and are divided into six stages, from the simplest "common billing and customer care" to the most sophisticated "access to 3GPP CS services." A few requirements for the inter-working scenarios were given. Also, in a function and requirement definition document [Non-patent document 3], the detailed requirements for the functions, e.g. authentication, access control, and charging, are discussed. Some methods for the authentication are investigated. They are mainly based on the UMTS AKA, and GSM SIM solutions. No solution about the other aspects, e.g. access control, and charging, is given. These documents are not finalized yet, and there are working groups actively working on them.

A draft is available for using the AKA schemes over the EAP method [Non-patent document 4]. It enables the use of third generation mobile network authentication infrastructure in the context of wireless LAN and IEEE802.1x technologies through the EAP over wireless. The problem with it is that it requires UMTS subscriber identity module or similar software modules. This might not be available for all the mobile devices. Also, the EAP-AKA scheme would require the user's IMSI in clear-text be sent to the EAP server when the user gets first connection to it. This might leak the user's identification information to entity (a mobile user coming from other network, etc.) that is ear-dropping the mobile terminals. The scheme uses a challenge message-response mechanisms and symmetric cryptography for the authentication.

The IEEE is also working on the authentication issues for the WLAN. The IEEE802.1x [Non-patent document 5], which introduced the EAPOL, gives a solution for using EAP [Non-patent document 6] on top of the Ethernet environments. The problem with it is that it only works for the Ethernet or the FDDI/Token Ring MACs. To make it work on other technologies, some adaptations must be made. This only provides a basic way for using the EAP methods for authentication, and the actual solution still relies on the individual EAP methods deployed. Also, this work does not address any other aspects in the inter-working, e.g. access control, QoS, etc.

IETF has an AAA working group [Non-patent document 7] that focuses on the developments of requirements for authentication, authorization, and accounting for network access. They base the work on the Diameter submissions. There are other working groups also working on issues related to inter-working, e.g. SEAMOBY group [Non-patent document 8], and SIPPING group [Non-patent document 9]. But most of them are assuming IP based environments, and are not specific to the WLAN problems, and there is not a concrete solution for all the problems.

In order for the WLAN to provide service to the mobile terminal, some decisions must be made based on the subscription information of the mobile terminal. When the mobile terminal requesting for services is registered under another administrative domain than the WLAN's, this information must be obtained from the mobile terminal's home domain. But in most of the cases, the information is confidential, and is not allowed to be disclosed to the WLAN due to the lack of trust relationships. Therefore, the home domain must have a way of provide crucial information for the WLAN to operate without compromising the confidentialities. Besides this, some networks would also require to provide protection of the mobile terminal's location information. Namely, the identification information of the mobile terminal should also be concealed in the message exchanges between the WLAN and mobile terminal.

The service provision in the WLAN requires certain underlying technology specific parameters. It is not feasible or sometimes impossible for the mobile terminal's home network to identify this information. Therefore, an entity in the WLAN must be able to translate the control information from the home network to local control messages.

Since the mobile terminal's subscription information is stored in its home domain, and WLAN do not have direct access to it, reports must be sent to the home domain from time to time to gain real-time monitoring and control of the service provided to the mobile terminal. These reports would generate a heavy traffic when large number of mobile terminals present. This would decrease the accuracy of the real-time control. Therefore, it is desired to have the WLAN to do some processing locally.

It is noted that, in this specifications, [Non-patent document 1] refers to 3GPP, http://www.3gpp.org, [Non-patent document 2] refers to "Feasibility study on 3GPP system to Wireless Local Area Network (WLAN) inter-working (Release 6)" 3GPP TR 22.934 V1.1.0 (2002-05), http://www.3gpp.org/specs/specs.html, [Non-patent document 3] refers to "3GPP system to Wireless Local Area Network (WLAN) inter-working; Functional and architectural definition (Release 6)" 3GPP TR 23.934 V0.3.0 (2002-06), http://www.3gpp.org/specs/specs.html, [Non-patent document 4] refers to "EAP AKA Authentication", http://www.ietf.org/internet-drafts/draft-arkko-pppext-eap-aka-03.txt, [Non-patent document 5] refers to "Standard for Local and metropolitan area networks: Port-Based Network Access Control" IEEE Std 802.1X-2001, http://www.ieee.org, [Non-patent document 6] refers to Extensible Authentication Protocol, http://www.ietf.org/html.charters/eap-charter.html, [Non-patent document 7] refers to Authentication, Authorization, and Accounting group, http://www.ietf.org/html.charters/aaa-charter.html, [Non-patent document 8] refers to SEAMOBY (Context Transfer, Handoff Candidate Discovery, and Dormant Mode Host Altering) group, http://www.ietf.org/html.charters/seamoby-charter.html, [Non-patent document 9] refers to SIPPING (Session Initiation Proposal Investigation) group, http://www.ietf.org/html.charters/sipping-charter.html, [Non-patent document 10] refers to DIAMETER, http://www.ietf.org/internet-drafts/draft-ietf-aaa-diameter-08.txt, [Non-patent document 11] refers to "Applied Cryptography" Second Edition, Bruce Schneiner, Wiley, 1996, [Non-patent document 12] refers to The DiffServ working group, http://www.ietf.org/html.charters/diffserv-charter.html, and [Non-patent document 13] refers to IP Mobility Support, RFC 3220, http://www.ietf.org/rfc/rfc3220.txt, respectively.

DISCLOSURE OF THE INVENTION

Since the WLAN is not allowed to have direct access to the mobile terminal's subscription information, the home network needs to have an alternative way to provide the WLAN necessary for serving the mobile terminal. This invention presents a rule-based solution. A rule engine is placed in the WLAN, and it controls the service provisioning of the WLAN. The home network of the mobile terminal would send rule information to the rule interpreter collocates with the rule engine that translates these rules to WLAN specific control information and feed it to the rule engine to execute, so that the WLAN knows how to serve the mobile terminal without compromising the information confidentiality of the home network.

Using this rule engine, the home network could also assign certain data processing job for accounting to the WLAN. Therefore, the WLAN could process some data locally before send it back to the mobile terminal's home network. This could save the valuable network resource for the signaling path.

In order to protect the identification information of the mobile terminal, a certain specific scheme based on combination of symmetric and asymmetric cryptography structure, e.g. public key, and pre-shared secret association (security mechanism), is introduced in this invention. Using it, the mobile terminal could communicate its identification information with its home network without leaking the identification information which is contained in certain critical information to the WLAN.

The present invention is to be used for the WLAN to inter-work with other networks. The inter-worked network could be another WLAN or a public cellular network. It is easy to deploy the invention in both of the cases. The invention is to be used for two purposes, the user identification and critical information protection, and access control.

To use the present invention for user identification and critical information protection, the implementer just need to make the messages that needs protection to be formed and encrypted based on the scheme described in the invention, e.g. the message between the mobile terminal and WLAN access point; between the access point and home domain servers. These messages are not bound to any underlying transport protocols. Therefore, they could be delivered using any proper method which depends on deployment requirements. For example, in an IEEE802.11 system, the message on the air interface could be transferred on top of the EAPOL (EAP over LAN), and in an IP network, the message between the access point and home network servers could be transferred on top of DIAMETER [Non-patent document 10].

To make each scheme work, before deployment, the mobile terminal must have the mobile user's home domain server public key. This key should be identified with an index string or number. This information could be stored in the user's SIM card, or to be distributed and manually input before first time use. Since the invention has the method for updating the keys, it is easy to manage the key. It could also be used in conjecture with other key management schemes as a supplementary.

Furthermore, when using the invention for the inter-working access control, implementer needs to place an interpreter in the WLAN as described in the invention. This interpreter would convert the rules sent from the user's home network to the WLAN specific command with proper parameters. This way, the home network does not need to maintain any information of the WLAN specific technologies. The interpreter could also make default local management decisions when the user's home network is not accessible or not able to make decisions, for example, allow the access to certain local WLAN resource. This could keep the service interruption to the minimum in case of signaling failure.

The rule interpreter could also send accounting information back to the user's home domain according to the specific rules set by the home domain rule server. The accounting attributes gathered could be configured by the rule server based on its needs. The rule interpreter could also be configured to support the real-time monitoring and batch accounting easily by issuing commands from the rule server.

BEST MODE FOR CARRYING OUT THE INVENTION

Figure 1:
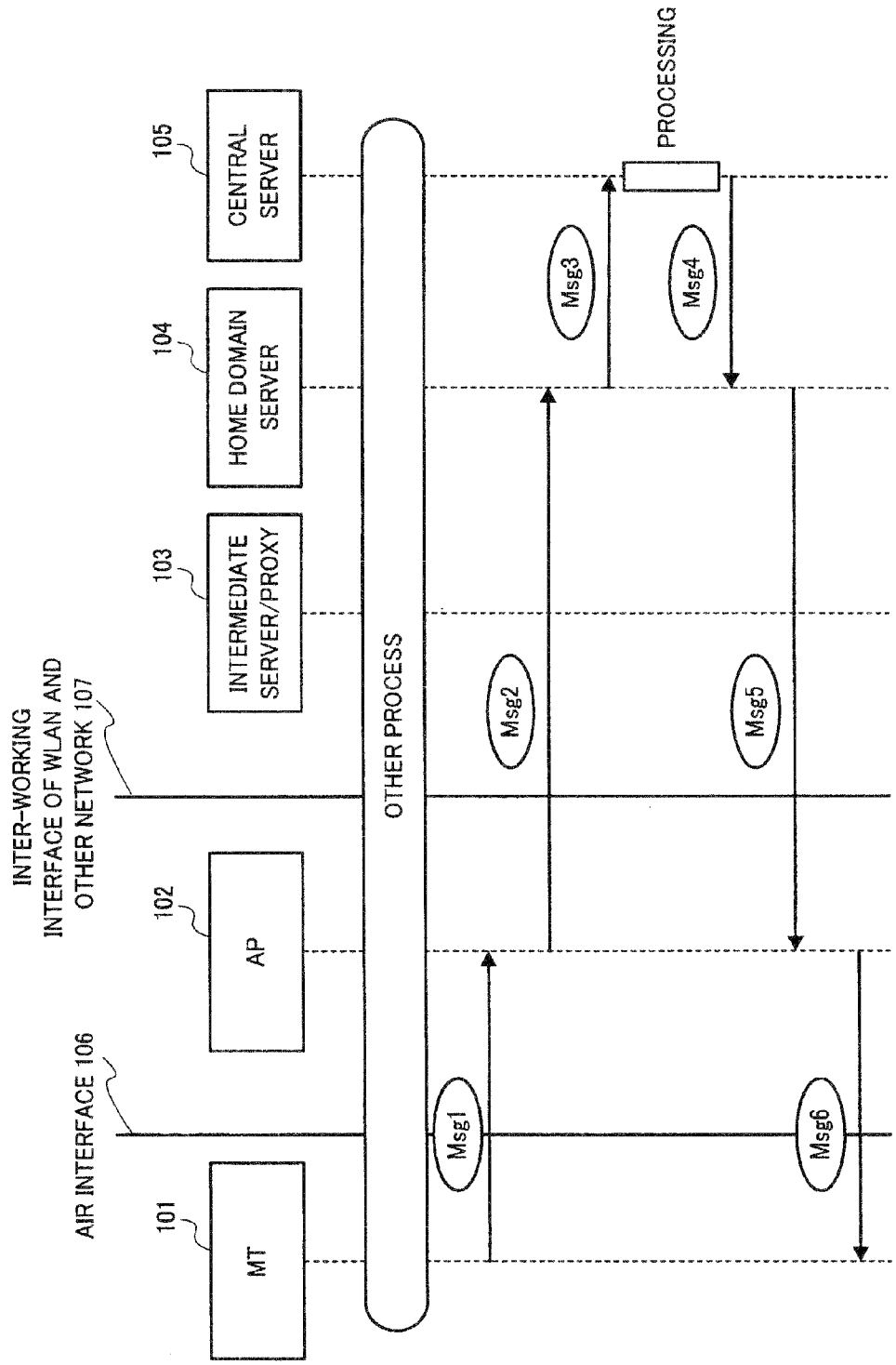
FIG. 1 is a diagram illustrating an example message sequence for WLAN inter-working. This diagram gives an example sequence for the WLAN inter-working that uses the message format for signaling with user identification information protected, and achieve mutual authentication between the mobile terminal, access point and the home network servers.

Embodiments of the present invention will be described in detail below with reference to the accompanying drawings.

An apparatus and methods for controlling policy (arrangements related to communications) in WLAN inter-working is disclosed in this section. To help understand the invention, the following definitions are used:

A "WLAN" refers to wireless local area network. It contains arbitrary number of devices in order to provide LAN services to mobile terminals through wireless technologies;

A "Mobile Terminal" refers to a device used for accessing the service provided by the WLAN and other networks through wireless technologies;

A "Home Network" refers to the network where the MT originally comes from in the inter-working scenario. It is the place the MT's service subscription information is stored;

A "Network Element" refers to any functioning device in the network that can carry out information processing;

A "Rule Engine" refers to a network element that carries out the rules set by the rule server and interpreted to the local specific commands by the rule interpreter;

A "Rule Interpreter" refers to a network element that reads in the rules given by the rule server, and translates them to local technologies specific commands with appropriate parameters and feeds to the rule engine to carry out;

A "Rule Server" refers to a network element that sends relevant rule sets to the rule interpreter and rule engine base on request or unsolicited;

An "Air Interface" refers to any radio access technologies for the mobile terminal to access the WLAN;

A "Stream" is a gathering of packets transferred in the network that have certain attributes in common;

A "Traffic" is a gathering of streams transferred in the network;

A "Flow" refers to the data path and the network resources needed for the data path used in delivering the stream;

"QoS" refers to the term Quality of Service of a data streams or traffic;

"Message" refers to the information exchanged between the Network Elements for the purpose of Inter-working control;

"Operation Sequence" refers to a series of Message exchanged between certain specific Network Elements in certain specific order for Inter-working control;

"Upper Layer" refers to any entity on top of the current entity that process the packet passed to it from the current entity.

In the following description, for purposes of explanation, specific numbers, times, structures, protocol names, and other parameters are set forth in order to provide a thorough understanding of the present invention. However, it will be apparent to anyone skilled in the art that the presented invention may be practiced without these specific details. In other instances, well-Known components and modules are shown in block diagram in order not to obscure the present invention unnecessary.

Embodiment 1

For inter-working between the WLAN and other networks, a few major issues need to be solved. These include Authentication, Authorization, and Accounting (hereafter referred to as AAA), QoS provisioning, and mobility control. Large parts of the issues desire a policy-based solution, e.g. authorization/admission control, QoS and mobility function deployment, etc.

The present invention provides such a solution for those WLAN inter-working related problems using a policy-based framework. The network inter-worked with could be of any type, e.g. 3G Networks, another WLAN network, or some proprietary network.

In course of the inter-working message exchanges, the identification information of the mobile user is required to be provided for the AAA purpose. This information should be available only to the intended network elements (e.g. AAA server). Otherwise, the security of the network would be compromised, and user's location information would be revealed to possible malicious persons.

Accordingly, the present invention presents a method for concealing the information from unauthorized party using hierarchical encryption, and asymmetric cryptography. Since no prior security association set up is needed for this method, it could be useful in the authentication process.

For a thorough understanding of the invention, here below, some operation sequences and information data structures used for the message exchanges are given. Some named protocols are used for illustration, but it does not preclude the use of other protocols for the same purpose, and it's not an indication of the recommendation of this invention. Certain data structures are used, and they only serve as an example of the implementation of the present invention. It is obvious to the person skilled in the art that in real implementation, new information could be added, and certain part could be omitted depending on the actual situation they are used in.

FIG. 1 is a diagram illustrating the operation sequence according to Embodiment 1 of the present invention. In this embodiment, an explanation is given taking an example of a case where communications is conducted between a mobile terminal and a central server.

As shown in the FIG. 1, the Mobile Terminal (MT), as marked by literal 101, is connected to the Access Point (AP), as marked by literal 102, in the WLAN through the Air Interface, as marked by literal 106. Messages are transmitted from the Access Point (102), through the Inter-working Interface, as marked by literal 107, and a series of Intermediate Servers/Proxies, as marked by literal 103, to the Home Domain Server of the mobile user, as marked by literal 104. For scalability reasons, the AAA process could happen at the Home Domain Server (104), or at a back-end server (Central Server) as marked by literal 105. When the Home Domain Server (104), and the Central Server (105) are collocated, the message exchanges are through internal interface, and thus does not need to know the exact message format.

In the example implementation, it is assumed that the Mobile Terminal (101) has a relatively permanent security association with the Central Server (105). This could be the IMSI related, for example for the 3G terminals. It is also assumed that the Home Domain Server (104) has a public-key and private-key pair for the asymmetrical cryptography scheme [Non-patent document 11], and the Mobile Terminal (101) has the public-key. This information could be distributed to the users at the subscription time, e.g. stored in the SIM card like device, or given to the user and to be keyed into the terminal to use, or to be put on a public accessible server and to be downloaded before use.

As shown in FIG. 1, the operation starts with the Mobile Terminal (101) sending a message to the Access Point (102) through the Air Interface (106).

Figure 2:
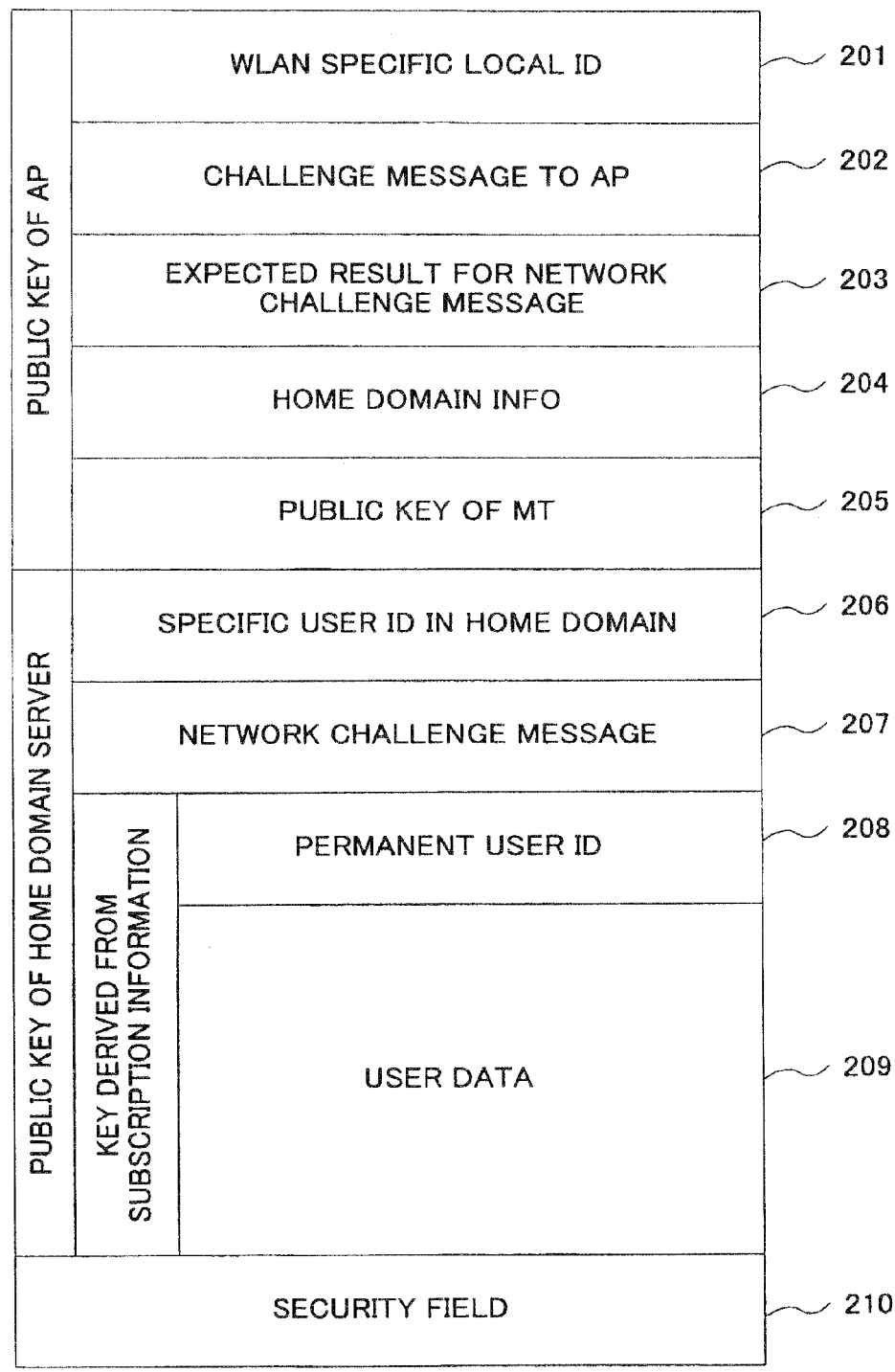
FIG. 2 is a diagram illustrating an example message format 1 for a mobile terminal sending information to Access Point. This diagram gives an example implementation of the message format to be used for the mobile terminal transferring information to the access point.

The message is of format Msg1, which is shown in FIG. 2. The message is to be transported by different mechanisms depending on which WLAN technology is used on the Air Interface (106). For example, in IEEE802.11, this could be carried by EAP over Ethernet [Non-patent document 11], and in HiperLAN/2, this could be over RLC messages. The message itself does not bind to any underlying technologies.

The example implementation of the message shown in FIG. 2 contains 10 parts (201-210). It is obvious to anyone skilled in the art that in real application, more information could be incorporated into the necessary fields, and some unnecessary could be removed depending on actual deployment situations. For the convenience of presentation, message fields are introduced in certain sequence. In actual implementation, the fields at the same encryption level could be put in any order. Each field could have a fix-width identifier to indicate its contents, and a length field to indicate its actual length.

The message begins with the WLAN Specific Local ID field, as marked by literal 201. This will contain the information to identify the Mobile Terminal (101) in the local WLAN context. For example, in the IEEE802.11 networks, this could be the Ethernet address of the mobile terminal, and in the HiperLAN/2 networks, this could be the MAC ID assigned to the Mobile Terminal (101).

A Challenge Message to AP field goes right after the above field, as marked by literal 202. It would contain some random generated string or number by the Mobile Terminal (101). The Access Point (102) is supposed to generate a reply using this string together with the security keys to verify itself to the Mobile Terminal (101). The scheme used to generate the reply could be any message authentication scheme, for example HMAC-MD5 [Non-patent document 12]. The security key used is to be carried by the returning messages from the Home Domain Servers (104).

An Expected Result for Network Challenge Message field, as marked by literal 203, comes next. This field contains the reply that the Access Point (102) should receive from the Home Domain Server (104). In the inter-working environments, the Access Points (102) would possibly inter-work with multiple domains. In order for the Access Point (102) to verify that a reply is from the legitimate server for the Mobile Terminal (101), contents in the field could be compared with the corresponding results contained in the reply messages.

Following that is the Home Domain Info field, as marked by literal 204. This field contains the information to identify the home network of the Mobile Terminal (101). Such information would be used by the Access Point (102) and other intermediate nodes to route the message to the proper AAA server for processing the Mobile Terminal's AAA information. The domain information could be in the form of a DNS domain name or Network Access Identifier (NAI) in the form of user@domain.name. Or, it could be straight the IP address of a server the message destined to.

Contained also in the field is the index of public key of the Home Domain Server (104) used for encrypting the user identification information. Since the Home Domain Server (104) might be using a few pairs of public-private-key at the same time, it is necessary for the Mobile Terminal (101) to indicate which key pair is employed to encrypt the current message.

The index could be a number or a string depending on implementation requirements. The Home Domain Server (104) would use certain hash function, for example, to convert it to the actual value to retrieve the key pair. The index information is embedded in the domain information filed. For example, if the NAI is used to carry the domain information, the user part of the NAI could be used to hold the key index, since the actual user ID is not needed here. A Public Key of MT field, as marked by literal 205, is also included in the message. This is for the Home Domain Server (104) or the Access Point (102) to securely send message to the Mobile Terminal (101) without get ear-dropped by other entities.

Up to here, all the above fields (201-205) are encrypted only with the public key of Access Point (102) to prevent eardrop, and therefore are accessible by the Access Point (102). The public key of Access Point (102) could be distributed to the Mobile Terminal (101) by periodical broadcasting.

On the other hand, from here, all the following fields (206-209) are encrypted with the public key of Home Domain Server (104) by the Mobile Terminal (101). They are not available to the Access Point (102), and any nodes in between. Access Point (102), and Intermediate Servers/Proxies (103), could use the Home Domain Info (204) to forward the message to the proper server.

Once received by the server, it would use the private key in the pair indicated by the key index contained in the Home Domain Info (204) to decrypt the message and obtain the necessary information. This part of the message, marked by literal 206 through 209 should be copied directly by the Access Point (102) to the messages sending to the Home Domain Server (104), as marked by literal Msg2 in FIG. 1.

A security Field, as marked by literal 210, is contained in the message for protection of the integrity of the information. In implementation, this could be, for example, the message digest computed using the HMAC-MD5 scheme.

As shown in FIG. 1, after receiving the message, Msg1, the Access Point (102) would extract the necessary information, and form another message Msg2, and send it to the Home Domain Server (104) through possible Intermediate Servers/proxies (103). As the number of available WLAN technologies is increasing quickly, the technologies used for interconnecting them, as marked by literal 107, could vary largely. The example used here for illustration is assuming an IETF IP based technology is employed. However, it is obvious to anyone skilled in the art that the invention is intended to be used with any underlying technologies. With certain modification/adaptations, it could be used on other non-IP based technologies, and even on top of those proprietary protocols.

Figure 3:
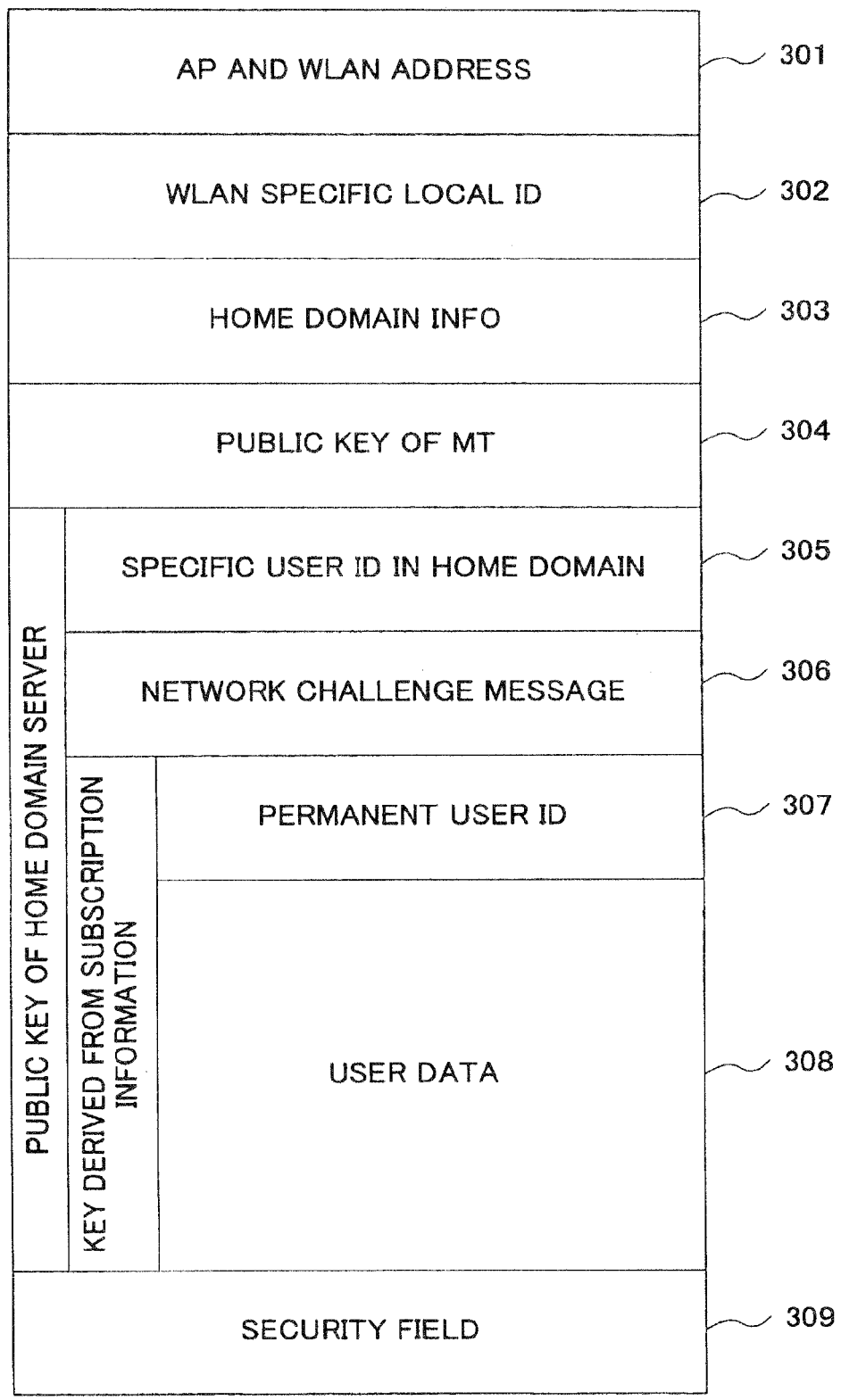
FIG. 3 is a diagram illustrating an example message format 2 for Access Point sending information to Home Domain Server. This diagram gives an example implementation of the message format to be used for the access point transferring information to the home domain server.

FIG. 3 shows the message format for Msg2.

The message starts with the AP and WLAN Address Field, as marked by literal 301. This information is needed for the routing of the reply messages. Format of this information is not limited. For example, a simple way is to use the Access Point (102)'s IP address if it has one. Otherwise, the AP identifier, and the address of the WLAN Gateway will be required. Right after this is the WLAN Specific ID field, as marked by literal 302. This field is the same as that in message format 1, as marked by literal 201.

All the above information is for the network nodes to identify the Mobile Terminal (101), and thus to establish a return route. Since the WLAN Specific ID (302) is a temporary ID and only has meaning in the WLAN context, it will not lead any information about the Mobile Terminal (101)'s actual identification information. As stated above, these fields should be accessible by possible all the nodes along the path, and thus should not be encrypted with special techniques. If the connections are point-to-point, or no reverse direction routing is necessary, this information could be protected by a security mechanism shared by the ends of the connections.

It is obvious that fields 303 through 308 are taken directly from those of Msg1, in which named 204 through 209. Fields 303, Home Domain Info is used for routing the message to Home Domain Server (104), if there are intermediate nodes exits.

Public Key of MT field, as marked by literal 304, is used to propagate the public key of the Mobile Terminal (101), so that the reply message could be protected if required. In order to verify the legitimacy of the key, a check sum, e.g. the fingerprint of the key should be provided in a secure way. This could be achieved by put the fingerprint in the user data, which is protected by the security mechanism between the user and the server keeping the subscription information.

Field 305 to 308 are meant to be read only by the Home Domain Server (104). Therefore, they are encrypted and protected by the public key of the Home Domain Server (104), and not accessible by any intermediate network elements.

A Home Domain Specific User ID field, as marked by literal 305, follows the MT key field. This is the User ID assigned to the mobile user by its home network. It is used to unique identify the user in the home network's context. If a user has a NAI in the form of userID@home.domain, this identifier corresponds to the userID part before the @. This Home Domain Specific User ID is not permanent. The home domain could assign a new identifier to the Mobile Terminal (101) by embedding it in the reply messages.

After receiving the message, the Home Domain Server (104) will check the Home Domain Info field (303), and find out the index of the public key used by the Mobile Terminal (101) to encrypt the message. Then, it will use the corresponding private key in the key pair to decrypt the message, and get the User ID information. If the user subscription information is stored at the server or inside the home domain, it should have the method to map this User ID information to the record entry for the user, and therefore to decrypt the reset of the message and do further processing.

Otherwise, if these are all controlled by another central server, or the home domain outsourced the AAA process to some outside server, the Home Domain Server (104) will forward the rest of the message to that server with the User ID attached. The rest fields of the message are encrypted by the security mechanism associated with the user subscription information, i.e. the permanent identifier. Therefore, this part of the information could only be retrieved by entities that have the user subscription information.

The first field is the Network Challenge Message field, as marked by literal 306. This is the randomly generated information by the Mobile Terminal (101). It is used for the Mobile Terminal (101) to verify the authority of the origin of the reply messages. The network side, e.g. the Central Server (105), should use a key derived from the user's subscription information to produce a reply for the Mobile Terminal (101) based on this challenge. Challenge reply should be embedded in the reply message. The network side should also generate a reply for the Access Point (102), to prove that it's the legitimate source for sending the reply. The reply for the Mobile Terminal (101) and the Access Point (102) could be the same or different depending on the implementation requirements.

After the Network Challenge Message field (306) is the Permanent User ID field, as marked by literal 307. This field contains the information to permanently and globally identify the user. It would remain constant during the user's entire subscription period. Using this information, user could be traced and subscription information could be retrieved from the database. This field is included for the cases when the subscription information is not stored in the Home Domain Servers (104). It could be also used by the server to verify the authority of the Mobile Terminal (101) by comparing this ID with the identification information mapped from the Home Domain Specific User ID.

Following the ID field is the User Data field, as marked by literal 308. This field contains the data from the Mobile Terminal (101) for the AAA sessions. In real implementation, this field could be protected by certain mechanism that uses the user's security mechanism derived from the subscription information. It could also contain the fields that protect the integrity of the information.

At the end of the message is the Security Field, as marked by literal 309. This field contains the information to protect the integrity of the whole message. The actual contents included depending on the deployment requirement.

When the Home Domain Server (104) and the Central Server (105) are collocated, the Home Domain Server (104) would be able to do all the same processing as done by Central Server (105), and to reply the message directly to the Access Point (102). When they are not integrated, i.e., the actual user information is not at the Home Domain Server (104), the server needs to forward the message to the Central Server (105) as shown in FIG. 1, using message Msg3.

Figure 4:
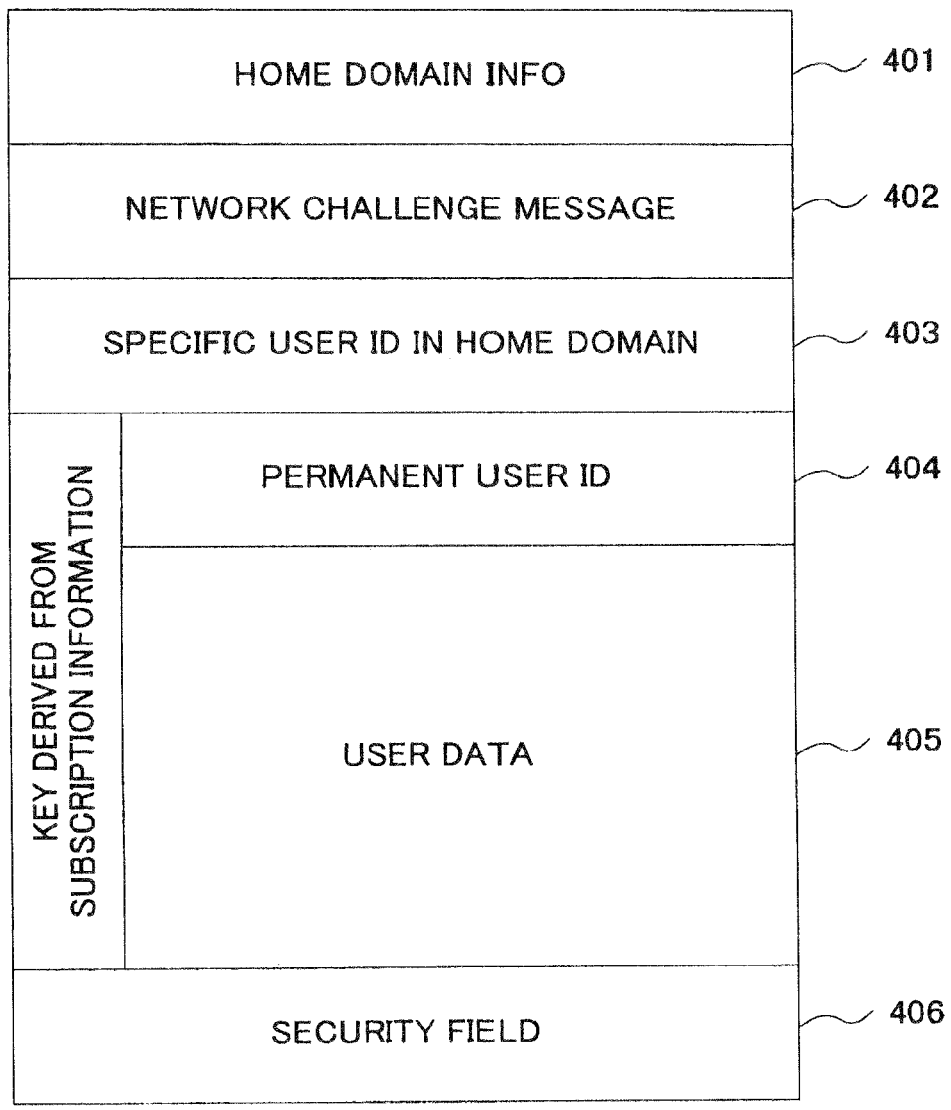
FIG. 4 is a diagram illustrating an example message format 3 for Home Domain Server sending a message to Central Server. This diagram gives an example implementation of the message format to be used for the home domain server transferring information to central server.

The example implementation of Msg3 is shown in FIG. 4.

The message starts with the Home Domain Info field, as marked by literal 401. This would contain the information for the Central Server (105) to identify the Home Domain Server (104). This is to assume that the Central Server (105) and the Home Domain Server (104) are not in the same domain. Followed this field are the Network Challenge Message field, as marked by literal 402, the Home Domain Specific User ID field, as marked by literal 403, Permanent User ID field, as marked by literal 404, and the User Data field, as marked by literal 405.

The Network Challenge Message field (402) and Home Domain Specific User ID field (403) contain the decrypted information from the Msg2.

The Permanent User ID field (404) and User Data field (405) are copied directly from the Msg2's corresponding fields. These two fields are encrypted with the security key derived from the subscription information by the Mobile Terminal (101).

At the end of the message is the Security Fields, as marked by literal 406. This is for protecting the integrity of the message using the security mechanism shared by the Home Domain Server (104) and the Central Server (405). After receiving the message, the Central Server (105) needs to decrypt the encrypted fields, and retrieve the information and do the proper process.

Figure 5:
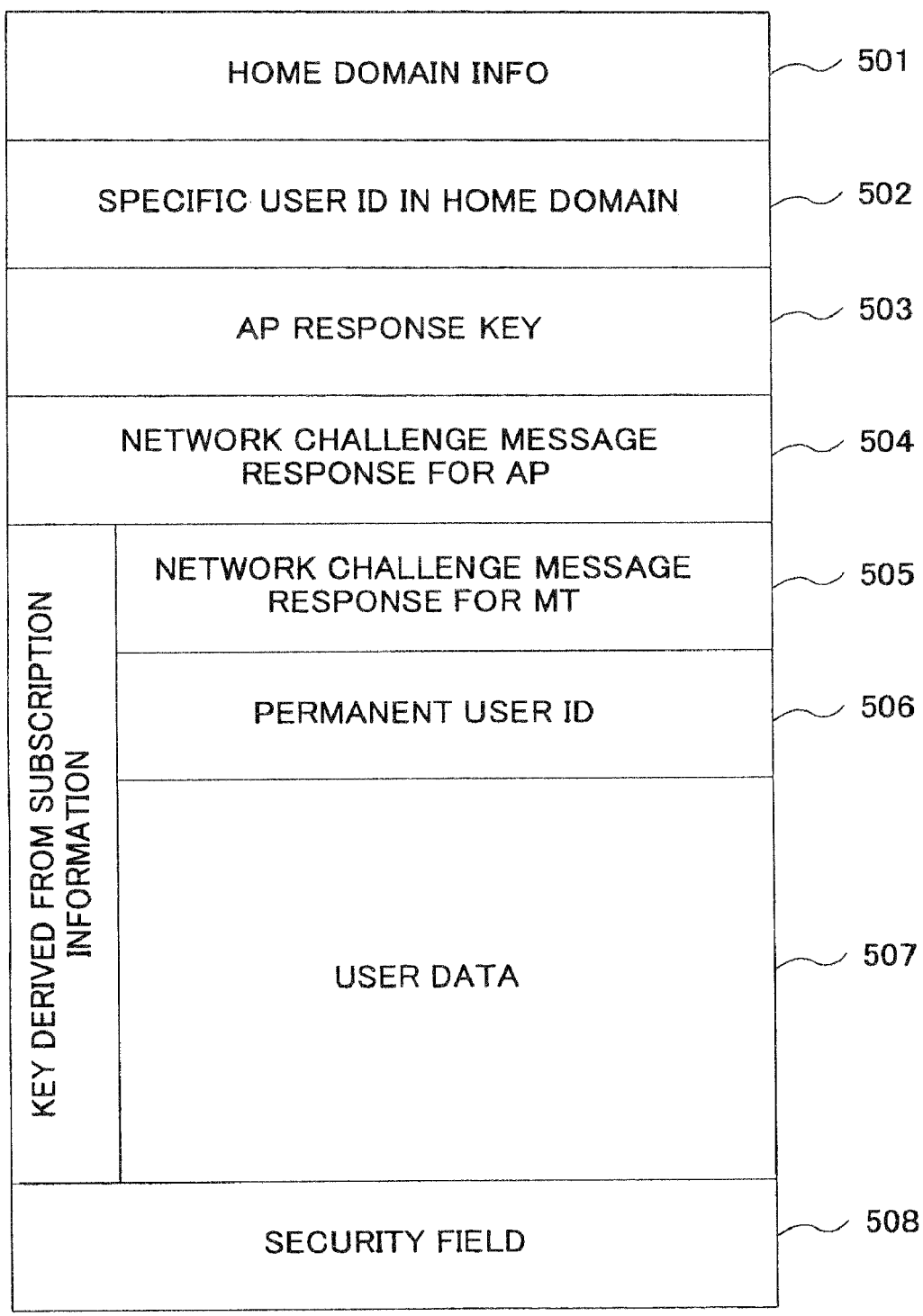
FIG. 5 is a diagram illustrating an example message format 4 for Central Server replying to Home Domain Server. This diagram gives an example implementation of the message format to be used for the central server transferring information to home domain server.

An example implementation of the reply message, Msg4, is shown in FIG. 5.

The message starts with the Home Domain Info field, as marked by literal 501. This contains the information for identify the Home Domain Server (104), in case these two servers are not directly connected. Home Domain Specific User ID field, as marked by literal 502, is used to contain the information for identify the Mobile Terminal (101) to the Home Domain Server (104), so that the Home Domain Server (104) knows where the reply message should be forwarded to.

The Central Server (105) should also calculate two security related replies. The first is the AP Response Key, as marked by literal 503. This key will be delivered to the Access Point (102) for it to generate a reply to the AP Challenge Message. The key is derived from the mobile user's subscription information, and therefore is also available at the Mobile Terminal. The other one is the Network Challenge Message Response for AP, as marked by literal 504. This would be delivered to the Access Point (102) too.

And the Access Point (102) will compare it with the Expected Result for Network Challenge Message (203), and to verify the authority of the source of the reply. These two fields are protected only by the security mechanism shared by the two servers.

Following these two fields is the Network Challenge Message Response for MT, as marked by literal 505. This is for the server to authenticate itself to the Mobile Terminal (101), and should be delivered to the Mobile Terminal (101).

Next, it is the Permanent User ID field, as marked by literal 506. This is for the Mobile Terminal (101) to check whether the message is for it.

The next field is the User Data, as marked by literal 507. This contains the AAA related reply from the server. Actual contents will depend on the operation carried on in the AAA session. For example, it could contain the new home domain specific user ID assigned to the mobile user. The above three fields, 505, 506, and 507, are encrypted with the security mechanism between the Central Server (105) and the Mobile Terminal (101) derived from the subscription information. Therefore, they are only accessible by the Mobile Terminal (101).

The last field in the message is the Security Field, as marked by literal 508. This field contains the information for protecting the integrity of the whole message using the security mechanism shared between the Home Domain Server (104) and the Central Server (105).

After receiving the message from the Central Server (105), the Home Domain Server (104) will extract the necessary information and process accordingly. A new message would be formed and forwarded to the Access Point (102) through the same route or different path depending on the implementation requirement, as marked by Msg5 in FIG. 1. The processing taken place in the Home Domain Server (104) includes mapping the user ID to the WLAN specific ID and WLAN address. These are simply the information contained in the corresponding message from the Access Point (102).

Figure 6:
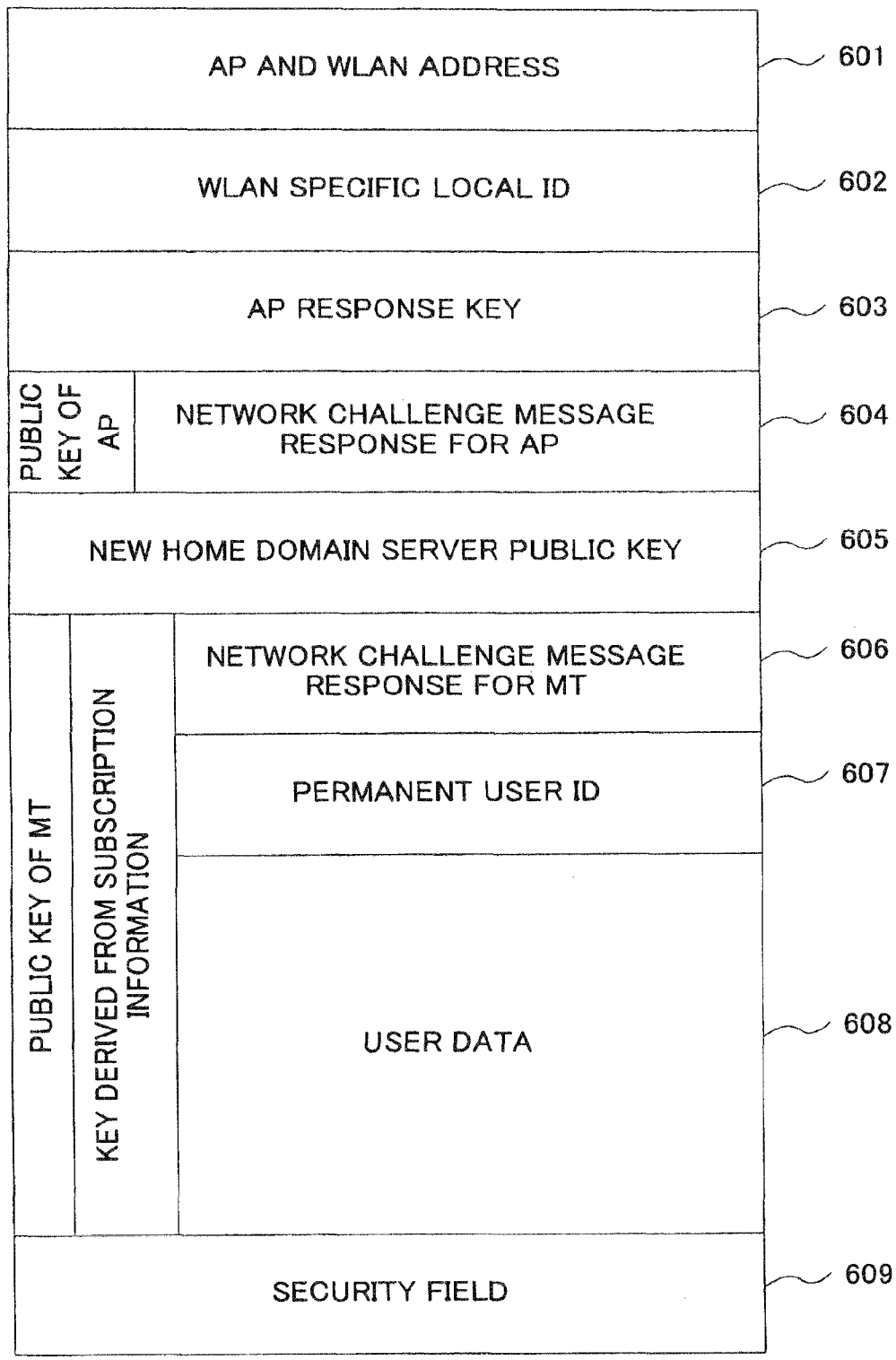
FIG. 6 is a diagram illustrating an example message format 5 for Home Domain Server replying to Access Point. This diagram gives an example implementation of the message format to be used for the home domain server transferring information to the access point.

An example implementation of the message format for Msg5 is shown in FIG. 6.

The message starts with the AP and WLAN Address field, as marked by literal 601. This field contains the information for identifying the Access Point (102) in the WLAN that the mobile user associated with. The address information is available in the Msg2 as shown in FIG. 3. The Home Domain Server (104) could maintain a table of the addresses sorted by the user ID. The table gets updated when the server receives a new message for that user ID, and thus could be used in the forming of corresponding reply message. The above part of the message is required for routing it to the correct terminal, and thus should not be encrypted.

Following this filed is the WLAN Specific Local ID field, as marked by literal 602. It contains the information for the Access Point (102) to identify the Mobile Terminal this message concerning to. This ID is also available in the Msg2, and it could be retrieved using the same method as that for the AP and WLAN Address (601).

Next field in the message is the AP Response Key field, as marked by literal 603. This contains the information for the Access Point (102) to generate responses to the Mobile Terminal (101)'s challenge. The contents are copied directly from the same field in Msg4, as marked by literal 503.

Following that is the Network Challenge Message Response for AP, as marked by literal 604. This field contains the response computed by the Central Server (105), and is for the Access Point (102) to verify the legitimacy of the Central Server (105). It could also be used by the Home Domain Server (104) to indicate the AAA process success/failure status to the Access Point (102). It is also copied directly from the field in Msg4, as marked by literal 504. The above fields are only meant to be accessed by the appointed Access Point (102), and therefore should be protected by the security mechanism shared between the Home Domain Server (104) and Access Point (102), for example, encrypted by the AP's public key.

Next in the message is the New Home Domain Server Public Key field, as marked by literal 605. This field is optional, and is used only when the Home Domain Server (104) need to change its public key. The information contained includes the new key, and the index for that key.

This field and the following fields, 606 to 608, are only to be accessed by the Mobile Terminal (101), therefore, should be protected by the public key of the Mobile Terminal (101), which is send to the Home Domain Server (104) in message Msg2.

In order to verify the legitimacy of the new key, a checksum, e.g. the fingerprint of the key should be provided in a secure way too. This could be achieved by put it in the user data field, which is protected by the security mechanism between the user and the server keeping the subscription information. In case of a separate central server, the Home Domain Server (104) could attach the fingerprint to the message Msg3 that sends to the Central Server (105), and ask the Central Server (105) to include it in the user data field of the return message. It is obvious to anyone skilled in the art that the field could also be used to carry key generation material instead of the real key. The real key could be derived at the MT side through old key or some subscription information, and thus provide better protection.

Following that is the Network Challenge Message Response for MT field, as marked by literal 606. This field contains the challenge message response generate by the Central Server (105) for verify its identity to the Mobile Terminal (101).

Next is the Permanent User ID field, as marked by 607, and the User Data field, as marked by literal 608. These fields are all generated by the Central Server (105), and are copied directly from the corresponding fields in Msg4, as marked by literal 505 to 507. They are protected by the security mechanism between the Central Server (105) and the Mobile Terminal (101) derived form the user's subscription information.

The last field of the message is the security field, as marked by literal 609. This field is used to carry the information to protect the integrity of the entire message using the security mechanism shared by the Home Domain Server (104) and the Access Point (105).

After receiving the message, the Access Point (102) will extract the required fields, such as the 602, 603, and process it. A new message will be generated and be forwarded to the Mobile Terminal (101) carrying the reset of the fields in the message Msg5.

Figure 7:
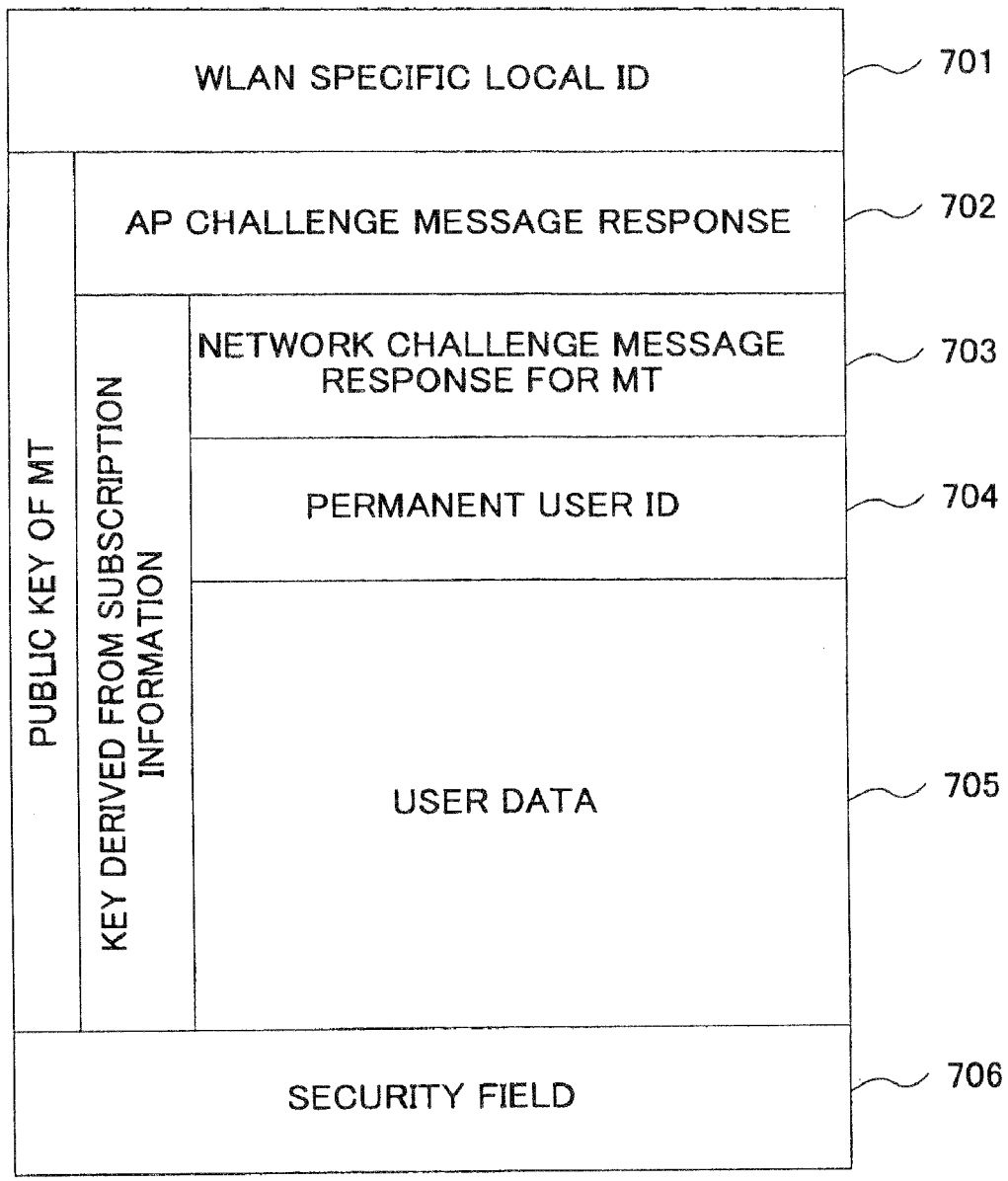
FIG. 7 is a diagram illustrating an example message format 6 for Access Point replying to a mobile terminal. This diagram gives an example implementation of the message format to be used for the access point transferring information to the mobile terminal.

An example implementation of the new message format for Msg6 is shown in FIG. 7.

The message starts with the WLAN Specific Local ID, as marked by literal 701. This is for the Mobile Terminal (104) to check whether the message is sent to it. This field needs not to be encrypted. The actual content of this field depends on the technology used; e.g. in IEEE802.11 network, this could be the 48 bit Ethernet address of the terminal, and in HiperLan/2 network, this could be the terminal's MAC ID assigned by the Access Point (102).

Following that is the AP Challenge Message Response field, as marked by literal 702. This contains the challenge computed by the Access Point (102) using the key sent from the Central Server (105) in Msg5, as marked by literal 603. The Mobile terminal (101) would use this challenge to verify the legitimacy of the Access Point (102). This field and the following fields, 703 to 705, should only be access by the intended receiver, and therefore should be encrypted by the public key of that Mobile Terminal (101).

Next field in the message is the Network Challenge Message Response for MT, as marked by literal 703. This field contains the response generated by the Central Server (105) using the security mechanism shared with the terminal. It is used to authenticate the network to the Mobile Terminal (101).

Following that is the Permanent User ID field, as marked by literal 704. This information is used by the Mobile Terminal (101) to further verify that the message is sent to the Mobile Terminal (101) itself.

The User Data field, as marked by literal 705, contains the AAA related information replied by the Central Server (105). It is used for AAA processing. The above fields are generated by the Central Server (105), and should be encrypted and protected by the security mechanism shared by the Mobile Terminal (101) and the Central Server (105).

The last field in the message is the Security Field, as marked by literal 706. This field contains the necessary information for protecting the integrity of the entire message.

Figure 8:
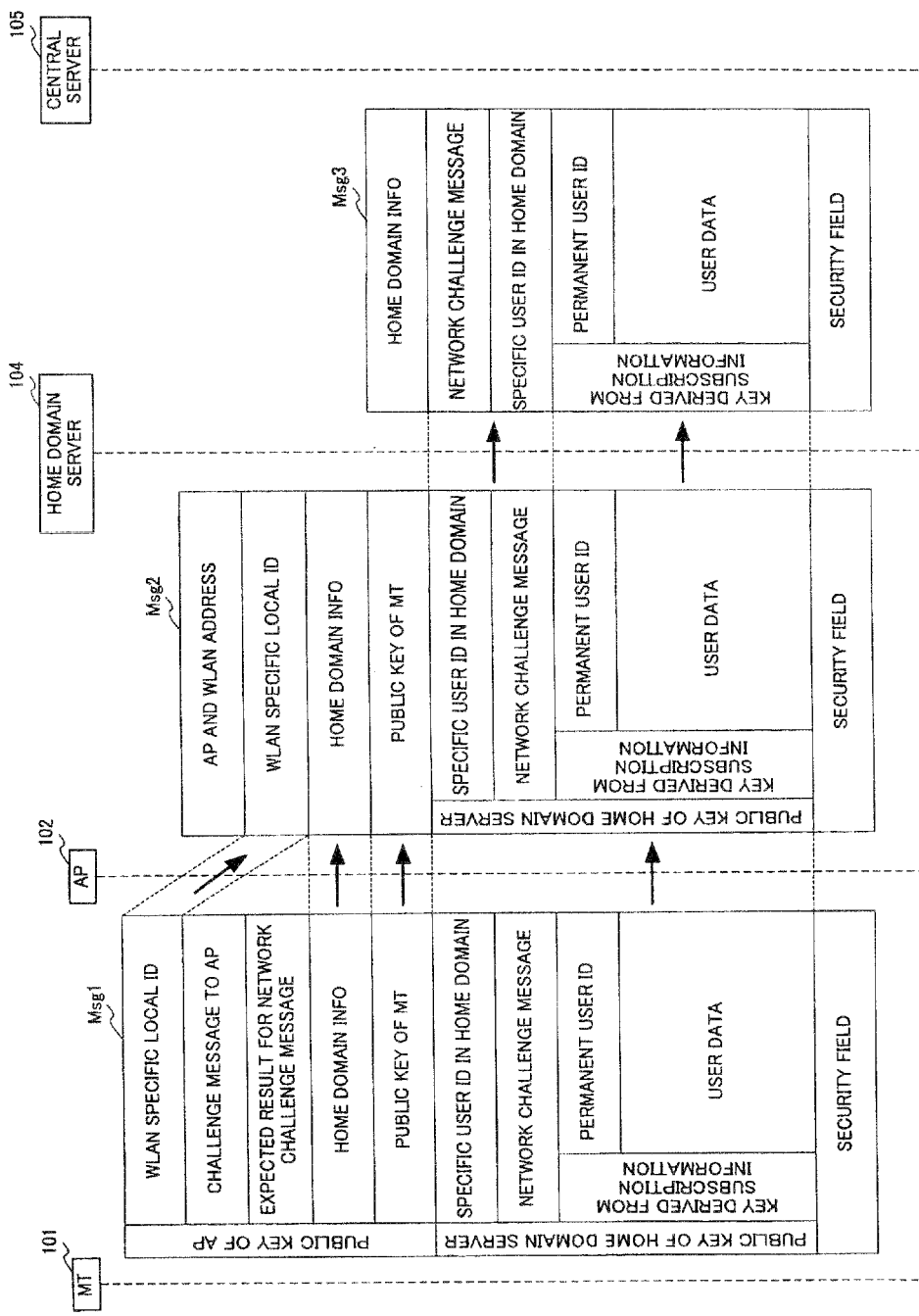
FIG. 8 is a diagram which provides an easy-to-understand summary of a message flow between MT—AP—Home Domain Server—Central Server and its association in configuration between each message.
Figure 9:
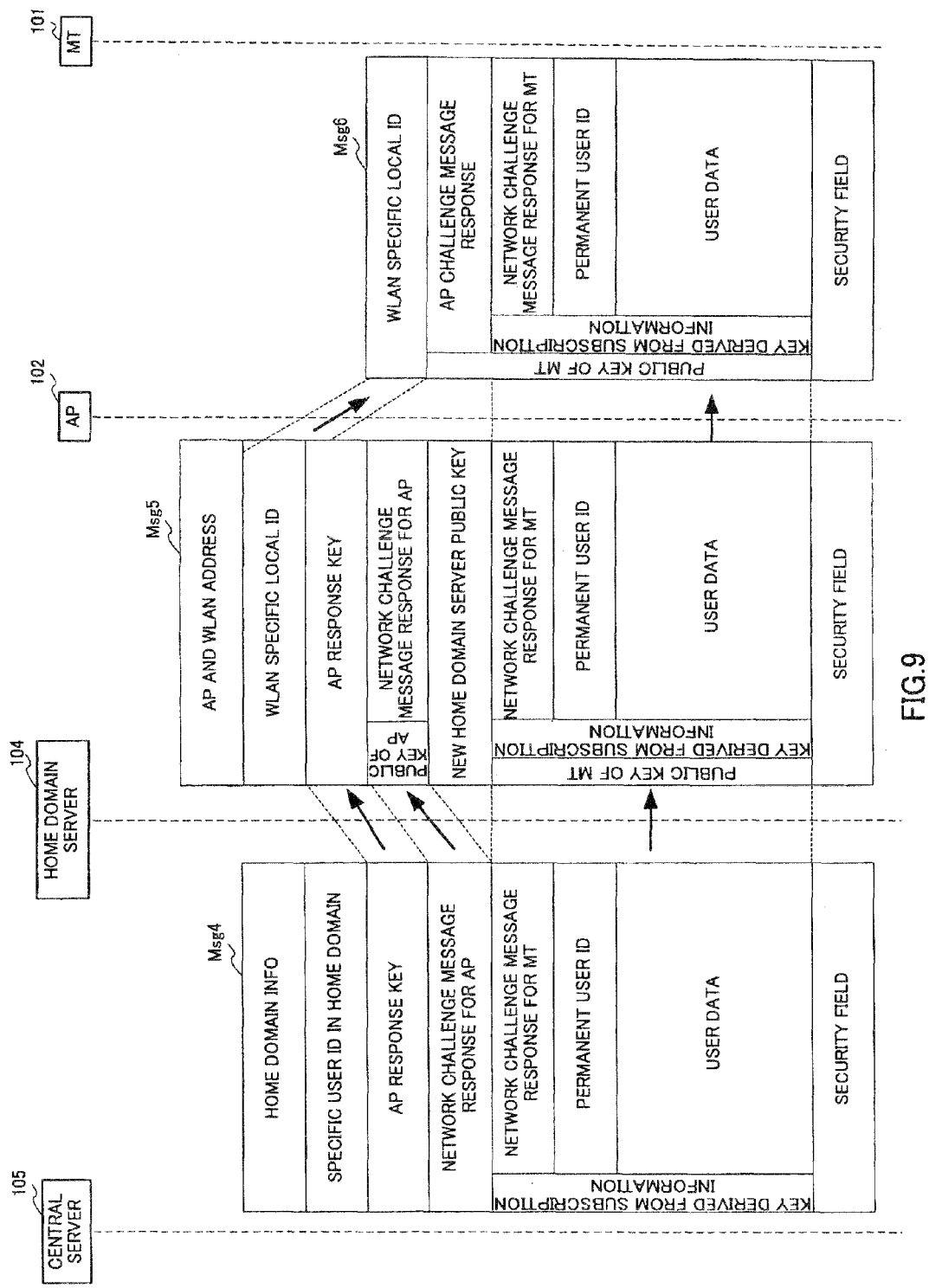
FIG. 9 is a diagram which provides an easy-to-understand summary of a message flow in the reverse order of the flow in FIG. 8 and its association in configuration between each message.

FIG. 8 is a diagram which provides an easy-to-understand summary of a message flow between MT—AP—Home Domain Server—Central Server and its association in configuration between each message which are described above. FIG. 9 is a diagram which provides an easy-to-understand summary of a message flow in the reverse order of the flow in FIG. 8 and its association in configuration between each message. The above description gives an example of the simple message exchange between the Mobile Terminal (101) and the AAA servers using the present invention.

In this way, according to this embodiment, when exchanging messages with the party on the other end of communications through some network elements (relay stations), each field which makes up a message is respectively subjected to encryption using the public key of each network element requiring each field. That is, each field making up a message is separately encrypted by using a security mechanism (encryption scheme) which is effective in between each network element respectively.

Specifically, when a mobile terminal transmits a message to a server, the part of the message containing the identification information of the mobile user is subjected to encryption by using the public key of the server, whereas the remaining part of the message is subjected to encryption by using the public key of the network element on its communications path. Alternatively, the part of the message containing the identification information of the mobile user is subjected to encryption by using a key derived from the subscription information of the mobile user, and such an encrypted message is further subjected to encryption by using the public key of the server, thereby achieving hierarchical encryption.

That is, by using a combination of the symmetrical and asymmetrical cryptography scheme, the present invention provides a solution for safely carrying out the AAA process in WLAN inter-working without leaking any user identification information to unauthorized entity. It is useful in preventing the man-in-the-middle attack. Note that it is obvious to anyone skilled in the art that the invention could also be used in a more complicated application with different combination of message sequences.

When deployed, this invention is particularly helpful in preventing the man-in-the-middle attack. For example, when there is a forged Access Point standing in between the Mobile Terminal (101) and the actual Access Point (102), it can only obtain the information about the Challenge Message to AP (202), and Expected Result for Network Challenge Message (203). This bogus Access Point (forged Access Point) is not able to get the right reply to the Challenge Message to AP (202), since this requires the key from the actual Home Domain Server (104) of the Mobile Terminal (101), and the key will not be forwarded out from the Access Point (102). Therefore, it is not able to pretend to be an actual Access Point (102) to the Mobile Terminal (101).

The invention is also useful in the situation where there is a malicious entity break into the link between the Access Point (102) and the Home Domain Server (104). In this case, this outside entity could not obtain any useful the information in the message sent from the Access Point (102), since the crucial parts of the message are encrypted by the Home Domain Server (104)'s public key. From the message sent back from the Home Domain Server (104), the entity could not obtain any useful information either, since it is encrypted by the AP's public key.

Figure 10:
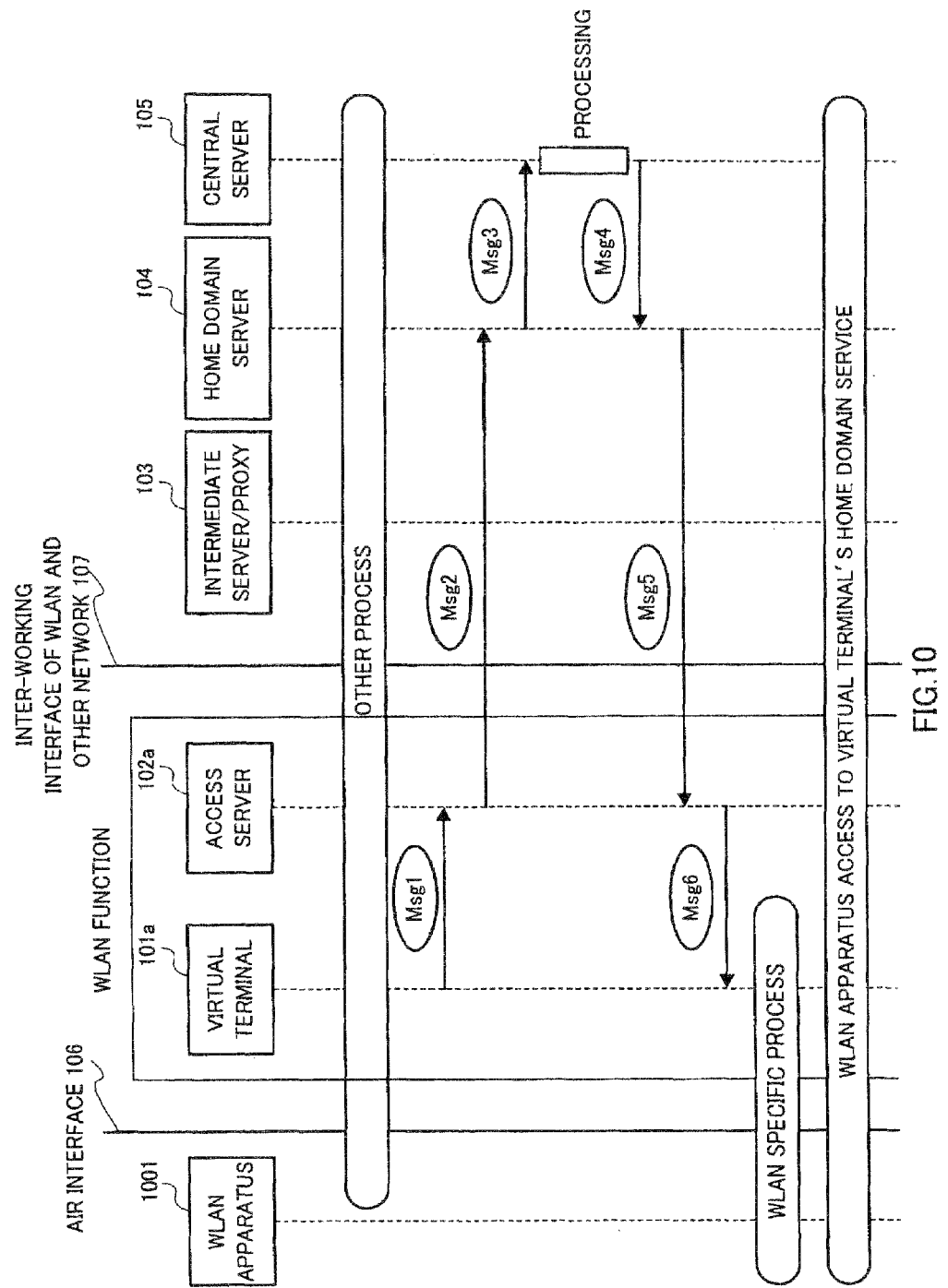
FIG. 10 is a diagram illustrating an example of variant scenario for WLAN inter-working. This diagram gives a variance of the scenario for the WLAN inter-working that uses a virtual terminal for access the user's credential and subscription for inter-working, and make the service available to WLAN devices.

FIG. 10 shows a variation example of WLAN inter-work scenario of the present invention.

In this scenario, the user credential and subscription information is stored in a Virtual MT, as marked by literal 101*a*. The Virtual MT (101*a*) may be located anywhere in the WLAN, for example may collocate with the Access Point. The inter-working sequence will start from the Virtual MT (101*a*). The message sequence and format could be exact the same as described above. The only difference here is that the Virtual MT (101*a*) is no longer connected through an Air Interface (106) to the Access Point.

The Access Server as marked by literal 102*a* is the entity that controls the connection from WLAN to the inter-worked network. Virtual MT (101*a*) could connect to the Access Server (102*a*) using any interface, e.g. wired, Infrared, Bluetooth, etc. It is also possible for the Virtual MT (101*a*) to collocate with the Access Server (102*a*). In this situation, the Msg1, and Msg6 will be used internally, and might not follow the exact format as defined above. Other message sequence and format will not be affected, and remains the same.

When this Virtual MT (101*a*) successfully obtained access to the service from home domain of the subscription, any WLAN Device as marked by literal 1001 associated with it would also be allowed to use the service. The security mechanism setup between the WLAN device (1001) and Virtual MT (101*a*) could be proprietary, and the security level is to be decided by the WLAN.

A real world example of this scenario is that a user hosts a WLAN Access Point at home, and s/he has one subscription to a public network, e.g. a 3G network, and s/he wants all devices at home to be able to access the 3G service once authenticated to the Access Point. This could be implemented using the above described invention by having the Virtual MT (101*a*) collocated with Access Point. The Virtual MT (101*a*) would access the user's credential and subscription information, e.g. his/her UICC, and proceed with the inter-work procedure. After that, WLAN devices (1001) could associate to the AP using any method desired by the user, e.g. a simple password protection, and use the 3G services, e.g. access the IMS service.

It is obvious to anyone skilled in the art that the invention could scale to multiple AP situations, in which the Virtual MT (101*a*) could collocate with an AP controller, or the WLAN's Access Server (102*a*) to the inter-worked network. It is also clear that the scheme applies to wired devices, i.e. device associated to the AP through wire or other interface instead of air interface could also enjoy the 3G services. In case of multiple virtual terminals exit in the WLAN, each of them should go through the inter-working procedure independently. When one virtual terminal is able to access multi user's information, e.g. accept multiple UICC card simultaneously, inter-working procedure for each of the user should be carried out independently. Virtual terminal could control the WLAN device (1001)'s access to the service subscribed by the user using proprietary means, e.g. password protection, security token, etc.

Embodiment 2

In the inter-working, WLANs need to make decisions based on user subscription information, e.g. admission control, from time to time. Since this information is stored in the user's home domain, and is generally not allowed to be shared, WLANs have to rely on the Home Domain Servers (104) to issue decisions. Since the home domain might not always have the detail knowledge of the technologies used in different WLANs it inter-worked with, the Home Domain Servers (104) are not able to give exact instructions to the resource management entities in the WLANs. Also, some applications, e.g. admission control, require local network information, and prevent decision making in home domain.

Figure 11:
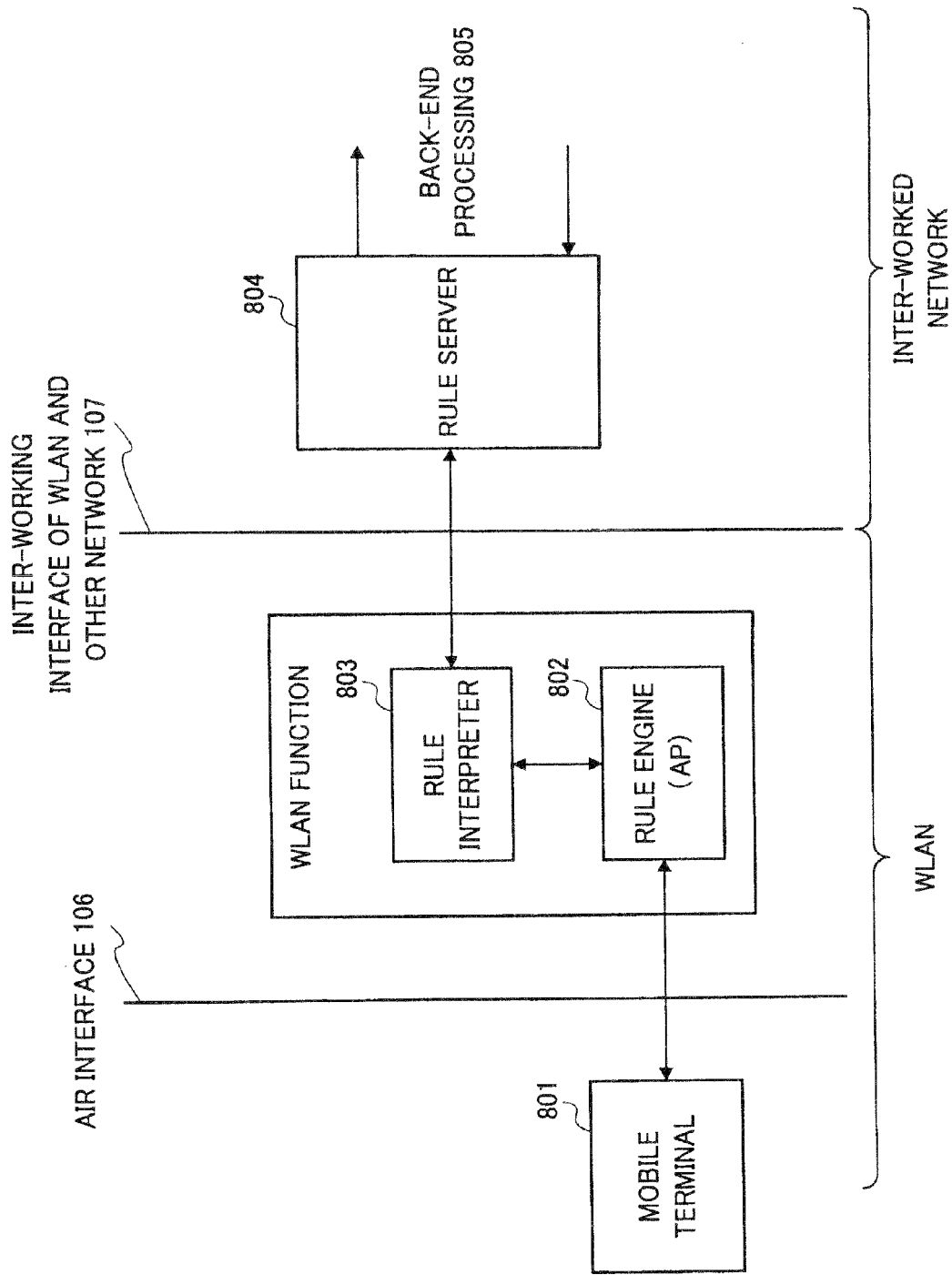
FIG. 11 is a diagram illustrating an example framework for the inter-working between WLAN and other networks. This diagram gives an example implementation of the framework for WLAN inter-working that uses the rule interpreter for localizing access control rules.

FIG. 11 shows an example implementation of the present invention that solves the problem. In the framework, the Mobile Terminal, as marked by literal 801, is connected to the network through the WLAN functions. The WLAN functions include the Rule Engine, as marked by literal 802, and Rule Interpreter, as marked by literal 803.

The Rule Engine (802) is the executor of the commands from the Rule Interpreter (803). It controls the accessibility of the Mobile Terminal (801), and manages the local network resources. As shown in the FIG. 11, this engine could collocate with the access point in the WLAN, but this is not mandated. In actual implementation, it could be a separate entity that has communication channels with the access point. The Rule Engine (802) also has the channel to signaling to the Mobile Terminal (801).

The Rule Interpreter (803) is the entity that receives rules from the home domain of the mobile user, and interprets them in the WLAN local context. It also has the responsibility to report mobile user status related information to its home domain.

The Rule Interpreter (803) receives rules from the Rule Server that resides outside of the WLAN, as marked by literal 804. There is no requirement for the placement of the Rule Server (804). The Rule Server (804) is required to provide rules that pertain to the mobile user using the inter-working service.

It is possible that the Rule Server (804) serves multiple networks that inter-work with the WLAN. The Rule Server (804) could also be a proxy that interfaces to the WLAN's Rule Interpreter (803), and uses back-end channels (Back-end Processing, as marked by literal 805) to retrieve information from the actual servers.

Figure 12:
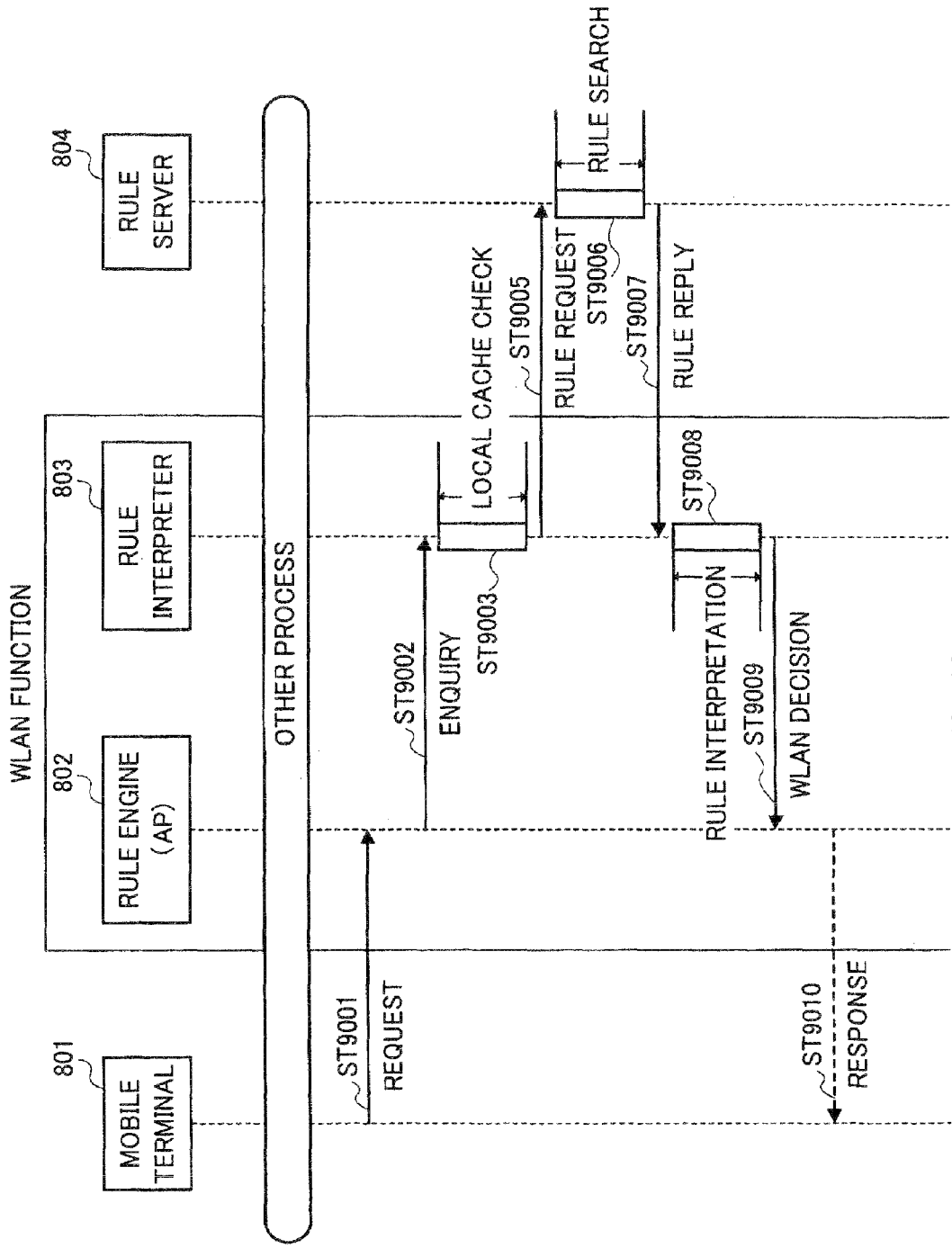
FIG. 12 is an example operation sequence for the inter-working framework. This diagram gives an example operation sequence in the WLAN when the rule interpreter is deployed.

A typical operation in the example implementation is shown in FIG. 12.

The mobile user would request certain service through the Mobile Terminal (801) from the WLAN, as marked by literal ST 9001. The Rule Engine (802) in the WLAN that controls the local resources would query the Rule Interpreter (803) about the corresponding operations to be taken, as marked by literal ST 9002. The Rule Interpreter (803) would check in it is local cache if a valid rule set exists applicable to the operation, as marked by literal ST 9003. If so, it would make a decision based on the rules and current network status in the WLAN, and making corresponding status feedback if required. This local cache could be implemented in the physical memory of the interpreter or an external non-volatile storage device.

Information stored in the cache would include the rule received from the Rule Server (804) in the previous transactions with a time range indicating its validity period. Certain indexing information should also be included for identifying and retrieving the rule. When a rule's validity expired, it should be marked as invalid and be removed in early opportunities. A later rule from the Rule Server (804) could also override the rule in the cache. In order for the proper retrieval of the rule, certain information defining the rule applicable range is also stored with it. This could be, for example, the domain information of the mobile user that should be using this rule. It is obvious to anyone skilled in the art that more information could be stored depending on implementation requirement. The rules are in a very generic form, since it is not feasible for the Rule Server (804) to obtain the underlying technology of each WLAN it connected to.

Therefore, the Rule Interpreter (803) needs to derive WLAN specific decisions with proper parameters from the rules regarding local network status. For example, the rule could be "ALLOW 3 Mbps BANDWIDTH; TIMELIMIT 10 min." When the WLAN is using HiperLAN/2, this could be translated by the Rule Interpreter (803) into decisions "allocated n number of LCHs for the terminal for uplink and downlink in every m MAC frames", and "send connection tear down command from AP after g number of MAC frames", where the n, m, g are calculated from the information of the HiperLAN/2 specifications. It is obvious to the person skilled in the art that the above is only an example, and the rule could be in any generic format agreed between the Rule Server (804) and the Rule Interpreter (803) depending on the operation involved. In a case where other WLAN technique is employed, the Rule Interpreter (803) should operate in the same method as in, for example, IEEE802.11 technique.

In addition, in a case where no available rule exists in the local cache of the Rule Interpreter (803), the Rule Interpreter (803) transmits a request to the Rule Server (804) as marked by literal ST 9005. When there are plural Rule Servers (804) connected to the Rule Interpreter (803), or the Rule Server (804) is a proxy, the Rule Interpreter (803) needs to use the mobile user's domain information to decide which server to use. In a case where there is no reply from the Rule Server (804), or in a case where no rule regarding the request is available at the Rule Server (804), the Rule Interpreter (803) needs to decide the mobile user's domain information in order to decide which server to use.

Or in a case where there is no reply from the Rule Server (804), or in a case where no rule regarding the request exists, the Rule Interpreter (803) may use certain pre-set default rule sets to make decisions about the operation.

For example, when no information about the user's access range available from the Rule Server (804), the Rule Interpreter (803) could decide to let it access local intranet only, or access internet resources depending on the trust level of the user's home network to the WLAN. This default rules could be stored in the Rule Interpreter (803)'s local cache or certain external storage that is accessible by the Rule Interpreter (803). It is obvious to anyone skilled in the art that there could be different rules for different operations.

When the Rule Server (804) received the enquiry from the Rule Interpreter (803), it would search its rule database for the corresponding rules, as marked by literal ST 9006. When the Rule Server (804) obtained the rules, it would send it to the Rule Interpreter (804), as marked by literal ST 9007. After receiving the rules from the Rule Server (804), the Rule Interpreter (803) would update its local cache with the new rule, and interpret it into WLAN specific commands, as marked by literal ST 9008.

The format for transferring the rule needs to be agreed between the Rule Server (804) and the Rule Interpreter (803). This could be done dynamically through sending the rule format definition to the Rule Interpreter (804) from the Rule Server (803). With this definition, the Rule Interpreter (803) is able to extract the necessary rule information from the message. In order to achieve this, the Rule Interpreter (803) needs to support a set of operations that could be used to define the rules.

```
Rule_interpretation_operations::={
    ADD;
    SUB;
    MUL;
    DIV;
    AND;
    OR;
    EQUAL;
    CONDITION;
    NEGOTIATE;
    ACCEPT;
    REJECT;
```

-continued

```
    STOP;
    RELOAD;
}
```

Data structure 1 shown above is an example of the operations supported by the Rule Interpreter (803). An example of the operation list required to support rule definition is given in data structure 1. In this, the ADD, SUB, MUL, DIV are corresponding to add, subtraction, multiply, and divide operations in mathematic context. AND, OR, EQUAL are logical operations widely used in all computation languages, e.g. the same as "&&", "||", and "==" in C programming language. CONDITION means that the rule has conditions to restrain its usage range. NEGOTIATE means that a negotiation is required before the actual decision could be made. ACCEPT means to accept the request for operation, and REJECT means to reject the request for operation. STOP means interrupting the current operation. RELOAD is for the Rule Server (804) to indicate to the Rule Interpreter (803) to update the definition and re-deploy. It is obvious to anyone skilled in the art that there could be more operations supported by the Rule Interpreter (803) in the real implementation.

In order to form the rules, the Rule Interpreter (803) also needs to be able to understand a set of basic attribute set. This would be operation and network dependant. To inter-work with different network, the Rule Interpreter (803) in the WLAN only needs to understand the information that is used in that network. For example when inter-worked with a 3G network, the Rule Interpreter (803) needs to know certain basic 3G related attributes. Another way is to have the Rule Interpreter (803) and the Rule Server (804) agree on a set of attributes that can form all the possible information in the inter-worked network.

```
Rule_interpretation_QoS_attributes::={
    MaxBandwidth;
    MinBandwidth;
    AverageBandwidth;
    MaxDelay;
    MaxJitter;
    MaxPktSize
    Burst;
    Filter;
    Meter;
    Marker;
    Dropper;
    StartTime;
    StopTime;
}
```

Data structure 2 shown above is an example of the attributes list for QoS rule interpretation. An example of the attributes list that needs to be supported for the QoS related operation is given in Data structure 2. The MaxBandwidth, MinBandwidth, AverageBandwidth are the attributes for the bandwidth related information. The MaxDelay, and MaxJitter gives delay related information about the rule. MaxPktSize gives information about the maximum packet size to be supported. The Burst would indicate the burstness allowed. The Filter is a compound attribute that contains field such as, source address (origination point address), destination address (termination point address), source port (origination point port), destination port (termination point port), TOS field, etc. It is used for the distinguishing of the stream to apply the rule from other streams. It is obvious to anyone skilled in the art that using the Filter, the rule could be specified to apply for one terminal or a group of users.

Meter, Marker, and Dropper are compound fields that are specific to DiffServ [Non-patent document 12]. StartTime, and StopTime indicate the starting and stop time for a certain operation. It is obvious to anyone skilled in the art that in real implementation there are more attributes to be supported by the Rule Interpreter (803) depending on the technology used in the inter-worked network. Using the above attributes and operations supported by the Rule Interpreter (803), the Rule Server (804) could define the format of the rules to be transferred. For example, a server needs to define a format as following:

```
        Example_QoS_format::= {OPERATION,
AVERAGEBANDWIDTH, BANDWIDTH_VAR, TIME_PERIOD}
    It could define the format as:
        Example_QoS_format_definition::={
    OPERATION::=OPERATION;
    AVERAGEBANDWIDTH::=AverageBandwidth;
    BANDWIDTH_VAR::=MaxBandwidth SUB MinBandwidth;
    TIME_PERIOD::=StartTime SUB StopTime;
    }
        Therefore, a QoS related rule could be send as following:
            Example_QoS_rule::=[ALLOW;10MBps, 100Kbps, 5
            hour}
```

It is obvious to anyone skilled in the art that there could be more complicated combination of the attributes and operations to form rules.

```
            Rule_interpretation_mobility_attributes::={
        OriginalAddress;
        CurrentAddress;
        HomeAgentAddress;
        LocalAgentAddress;
        NextAgentAddress;
        TunnelAddress;
        LocalAccessAddress;
        StartTime;
        StopTime;
        Filter;
        }
```

Data structure 3 shown above is an example of the attributes list for mobility rule interpretation. An example of the attributes collection that needs to be supported by the Rule Interpreter (803) in order to support mobility is given in Data structure 3. The OriginalAddress is, for example, the home address of the Mobile Terminal (801) in MobileIP [Non-patent document 13] context. The CurrentAddress is the care-of-address in MobileIP's context. The HomeAgentAddress, and LocalAgentAddress are the home agent's address and foreign agent address in MobileIP's context. The NextAgentAddress could be the agent in next domain the Mobile Terminal (801) expected to enter. The TunnelAddress is the address for tunneling, which is the traffic needs to be routed through tunneling. LocalAccessAddress is the address for local AAA service. StartTime and StopTime are used to indicate the lifetime of the above information, Filter is the compound attribute that used to distinguish the stream to apply with the rule from other streams.

It is obvious to anyone skilled in the art that the real implementation would include more attributes in the list, and the definition of the above attribute would vary depending on the technologies used. After interpreting the rules using the definition sent from the Rule Server (804) at the Rule Interpreter (803), as marked by literal ST 9008, the Rule Interpreter (803) would send the detail decisions to the Rule Engine (802) for execution, as marked by literal ST 9009. It is also possible for the Rule Interpreter (803) to forward some information to the Mobile Terminal (801) in case some cooperation is needed at higher level to carry out the rule properly. For example, to send the IP layer filter information, so that the stream would be passed down to the Ethernet layer with proper marking. It is also possible for the Rule Server (804) to redefine the rule format by sending a new definition, and then a RELOAD operation rule. This could also be accompanied by time information that makes the updating happen at certain preset time.

In the system, the Rule Interpreter (803) could also be configured to support accounting and monitoring. In a normal accounting implementation, the WLAN need to transfer all the raw data collected to the home network of the mobile user. This would waste the network resources since not all the data are needed. And it also poses a large computation burden on the accounting server at the home network since it needs to process all the raw data and acquire desired information.

A way to solve this is to have the WLAN do some local processing first, and send back only the data specified by the home network. Since different WLAN has different statistics for recording, some preliminary filtering is required. The Rule Interpreter (803) would collect corresponding statistics and convert them into the records that would be useful in the inter-working. The set of records to be obtained should be basic sets that could be used to form any further sophisticated records. The Rule Server (804) and the Rule Interpreter (803) should have an agreement on the basic sets, or a common open standard could be adopted, for example the attributes defined in RFC2924.

```
            Rule_interpretation_accounting_attributes::={
        StartTime;
        EndTime;
        CurrentTime;
        ReportPeriod;
        BatchReportingTime PacketTransmitted;
        PacketDropped;
        ByteTransmitted;
        ByteDropped;
        Priority;
        Bit_rate_average;
        Bit_rate_Max;
        Bit_rate_Min;
        Max_Pkt_size;
        Min_Pkt_size;
        Max_Pkt_interval;
        Min_Pkt_interval;
        Min_Drop_interval;
        }
```

Data structure 4 shown above is an example of the attributes for accounting rule interpretation. An example of the attributes to be supported by the Rule Interpreter (803) for forming accounting rules is given in Data structure 4. These include the basic information that should be collected by the Rule Engine (802) and should be available at the Rule Interpreter (803). The Rule Server (804) would send a definition of the accounting record desired to the Rule Interpreter (803) using these attributes and the mathematic operations. For example, when the detail records required by the home network are the duration of the traffic, the bandwidth used, the bandwidth variance, the drop rate of the packet, the definition of the accounting list send by the Rule Server (804) could be:

```
Example_accounting_list::={
    DURATION::=EndTime SUB StartTime;
    BANDWIDTH::=Bit_rate_average;
    BANDWIDTH_VAR::=Bit_rate_Max SUB Bit_rate_Min;
    DROP_RATE_PKT::=
            PacketDropped DIV
            TOTAL_PKT::=[PacketTransmitted ADD
    PacketDropped];
    }
```

It's obvious to anyone skilled in the art that there would be more attributes collected by the WLAN than that listed in the example. The actual information collected would also depend on the technologies used in the WLAN. When an attribute used for the accounting specification is not recognized by the Rule Interpreter (803), an error report should be sent to the Rule Server (804), so that the error would be noted, or a substitution could be negotiated. It is also obvious that the above scheme could be used for status monitoring of the WLAN too. Real-time accounting, e.g. accounting for prepaid service, could also be implemented using the facilities provided above. For example, this could be implemented by setting a rule with the condition as following:
{STOP; CONDITION ByteTranmitted EQUAL 10 MB}.

The Rule Interpreter (803) would translate this into WLAN specific conditions, e.g. in terms of number of LCHs for a HiperLAN/2 system, and issue a disassociation command to the access point upon the fulfillment of the conditions. In case of user top up or upgrade of service, a new rule from the Rule Server (804) can override the old one with new conditions. The Rule Interpreter (803) is also allowed to adapt the interpretation of the rules in case of network condition change in the WLAN. This could happen, for example, when the modulation scheme change or error rate change in the system occurs so that the former interpretation becomes no longer valid. When this kind of situation occurs, the Rule Interpreter (803) need to adapt the mapping between rules and WLAN local parameters so that the service would not be interrupted, and report the changes to the Rule Server (804). The Rule Server (804) would be able to evaluate the changes and possibly re-issue rules. This way, service interruption due to transient states in WLAN could be avoided.

The 1st aspect of the present invention is a method of protecting mobile user identification information in a WLAN inter-working, comprising the steps of: i. performing hierarchical encryption of a message containing the mobile user identification information with different keys at different encryption levels; ii. using home domain name for assistance in routing the encrypted message to a correct network; and iii. using temporary domain specific identifier for further concealing of an actual identification information of the mobile user.

The 2nd aspect of the present invention is the method of protecting the mobile user identification information according to the above procedure, further comprising the steps of: i. using asymmetric cryptography scheme for protection of the mobile user identification information with an intended receiver's key; and ii. using challenge message-response exchange scheme for a mutual authentication of a mobile terminal and a network to protect against attacks.

The 3rd aspect of the present invention is the method of protecting the mobile user identification information according to the above procedure, further comprising the steps of: i. sharing the intended receiver's asymmetric cryptography key with the mobile terminal prior to a start of message exchanges by storing it in a storage device that could be accessed by the mobile terminal securely; ii. updating the asymmetric cryptography key pair to be used by including a new key in a replied message and encrypted and protected by the current key; and iii. identifying the asymmetric cryptography key pair currently used in the encryption for the identification information protection by embedding an information in a domain information.

The 4th aspect of the present invention is the method of protecting the mobile user identification information according to the above procedure, wherein a message sequence for the WLAN inter-working is capable of mutually authenticating the mobile terminal with WLAN, and its home network in one message round trip, the message sequence comprising: i. the mobile terminal sending to the access point a message comprising the encrypted identification information, a mutual authentication information, a mobile user home domain information, and other necessary information; ii. the Access point sending to a mobile user's home domain server a message comprising the encrypted mobile user identification information, the mutual authentication information, and other necessary information by using the mobile user home domain information; iii. the Access point receiving from the mobile user's home domain server a message comprising the mutual authentication information and other necessary information; and iv. the Mobile terminal receiving from the access point a message comprising the mutual authentication information and other information forwarded by the access point from other servers.

The 5th aspect of the present invention is the method of protecting the mobile user identification information according to the above procedure, wherein the message sequence for the WLAN inter-working further comprises: i. the Mobile user's home domain server sending to a central server a message comprising the mutual authentication information and other information forwarded by the access point from mobile terminal; and ii. the Mobile user's home domain server receiving from the central server the message comprising the mutual authentication information and other information to be forwarded to the mobile terminal.

The 6th aspect of the present invention is the method of protecting the mobile user identification information according to the above procedure, wherein a set of message format to be used in the message sequence for the WLAN inter-working comprises: i. mobile user identifier specific to the WLAN accessible to all network nodes; ii. mobile user's home domain information accessible to all network nodes; iii. mobile user's credential and identification information hierarchical encrypted and only accessible by the intended receivers; iv. authentication challenge and response encrypted and only accessible by parties involved in the mutual authentication; and v. information for message integrity protection.

The 7th aspect of the present invention is the method of protecting the mobile user identification information according to the above procedure, wherein a message format to be used for the WLAN inter-working further comprises: i. information for identifying a key used for the hierarchical encryption to the intended receiver; and ii. information for generating a new key for the identification information protection.

The 8th aspect of the present invention is the method of protecting the mobile user identification information according to the above procedure, that is capable of sharing user's subscription within the WLAN, comprising the steps of: i. arranging one or more virtual terminals that are able to access the user's credential and subscription information and carry out the inter-working function as a normal mobile terminal from the inter-worked network; ii. using the virtual terminal as a gateway for a WLAN device associated with it to access services provided by the inter-worked network; and iii. controlling the service access of the WLAN device to the inter-worked network by the virtual terminal.

The 9th aspect of the present invention is the method of protecting the mobile user identification information according to the above procedure, further comprising the steps of: i. accessing the one or more users' credential and subscription information simultaneously by the virtual terminal; and ii. sharing these one or more users' subscribed services from the inter-worked network in WLAN simultaneously.

The 10th aspect of the present invention is a method of inter-working a WLAN with other networks, comprising the steps of: i. executing rule sets, and control resources allocation in the WLAN accordingly by a rule engine in the WLAN; ii. sending the rule sets from a rule server in the network to a rule interpreter; and iii. interpreting the rules from the rule server and convert to a WLAN specific action instruction for the rule engine by the rule interpreter in the WLAN.

The 11th aspect of the present invention is the method of inter-working the WLAN with other networks according to the above procedure, further comprising the steps of: i. locally storing the rules in the WLAN; and ii. using default rule sets by the rule interpreter when the rule server is not available or not able to give relevant rules.

The 12th aspect of the present invention is the method of inter-working the WLAN with other networks according to the above procedure, further comprising the steps of: i. configuring the translation of the rule at the rule interpreter by sending the rule definition from the rule server; ii. setting a life time range of the rules by including it in the message from the rule server; and iii. modifying a behavior of the rule interpreter and re-deploying by sending new definition and re-deploy message from the rule server.

The 13th aspect of the present invention is the method of inter-working the WLAN with other networks according to the above procedure, for real time status reporting in the WLAN inter-working schemes, further comprising the steps of: i. the rule server's specifying the information and the format to be reported from the rule interpreter; ii. the rule interpreter's forming the information in the format set by the rule server from the actual WLAN specific status information; where the information for the rule interpreter allowing mathematical operations, logic operations and operational commands to execute the mathematical and logical operations to be carried out; and the operations commands include conditional operations to be carried out, timing information for the operations to be executed, admissions control of operations and re-executions of the operations.

The 14th aspect of the present invention is the method of inter-working the WLAN with other networks according to the above procedure, further comprising the steps of: i. automatically adapting the translation of the rules by the rule interpreter in case of changes in network status and network resource availability in the WLAN; and ii. reporting the adaptation made at the rule interpreter to the rule server.

The 15th aspect of the present invention is the method of inter-working the WLAN with other networks according to the above procedure, further comprising the steps of: i. configuring individual terminal related QoS provisioning in the WLAN from the rule server; and ii. configuring a group of terminals related QoS provisioning in the WLAN from the rule server.

The 16th aspect of the present invention is the method of inter-working the WLAN with other networks according to the above procedure, further comprising the steps of: i. configuring individual terminal related traffic routing and mobility information in the WLAN from the rule server; and ii. configuring a group of terminals related traffic routing and mobility information in the WLAN from the rule server.

The 17th aspect of the present invention is the method of inter-working the WLAN with other networks according to the above procedure, further comprising the steps of: i. doing local accounting at the rule engine according to the WLAN specific requirement; ii. managing the rule translation according to the accounting results at the rule interpreter; iii. configuring the accounting report format at the rule interpreter by the rule server; and iv. forming the accounting report in the format set by the rule server from the WLAN specific statistics at the rule interpreter.

The 18th aspect of the present invention is the method of inter-working the WLAN with other networks according to the above procedure, further comprising the steps of: i. supporting real-time accounting for pre-paid subscription by setting local accounting criteria at the rule interpreter; and ii. supporting batch accounting by setting accounting rules at the rule interpreter.

The 19th aspect of the present invention is an apparatus for protecting mobile user identification information in a WLAN inter-working, comprising: i. means for performing hierarchical encryption of a message containing the mobile user identification information with different keys at different encryption levels; ii. means for using home domain name for assistance in routing the encrypted message to a correct network; and iii. means for using Temporary domain specific identifier for further concealing of an actual identification information of the mobile user.

The 20th aspect of the present invention is the apparatus for protecting the mobile user identification information according to the above configuration, further comprising: i. means for using asymmetric cryptography scheme for protection of the mobile user identification information with an intended receiver's key; and ii. means for using challenge message-response exchange scheme for a mutual authentication of a mobile terminal and a network to protect against attacks.

The 21st aspect of the present invention is the apparatus for protecting the mobile user identification information according to the above configuration, further comprising: i. means for sharing the intended receiver's asymmetric cryptography key with the mobile terminal prior to a start of message exchanges by storing it in a storage device that could be accessed by the mobile terminal securely; ii. means for updating the asymmetric cryptography key pair to be used by including a new key in a replied message and encrypted and protected by the current key; and iii. means for identifying the asymmetric cryptography key pair currently used in the encryption for the identification information protection by embedding an information in a domain information.

The 22nd aspect of the present invention is a system of protecting a mobile user identification information, wherein a message sequence for a WLAN inter-working is capable of mutually authenticating a mobile terminal with WLAN, and its home network via an access point in one message round trip, the message sequence comprising: i. the mobile terminal sending to the access point a message comprising an encrypted identification information, a mutual authentication information, a mobile user home domain information, and other necessary information; ii. the access point sending to a mobile user's home domain server in the home network of the mobile terminal a message comprising the encrypted mobile user identification information, the mutual authentication information, and other necessary information by using the mobile user home domain information; iii. the access point receiving from the mobile user's home domain server a message comprising the mutual authentication information and other necessary information; and iv. the mobile terminal receiving from the access point a message comprising the mutual authentication information and other information forwarded by the access point from other servers.

The 23rd aspect of the present invention is the system of protecting the mobile user identification information according to the above configuration, wherein the message sequence for the WLAN inter-working further comprises: i. the mobile user's home domain server sending to a central server a message comprising the mutual authentication information and other information forwarded by the access point from mobile terminal; and ii. the mobile user's home domain server receiving from the central server the message comprising the mutual authentication information and other information to be forwarded to the mobile terminal.

The 24th aspect of the present invention is the system of protecting the mobile user identification information according to the above configuration, wherein a set of message format to be used in the message sequence for the WLAN inter-working comprises: i. mobile user identifier specific to the WLAN accessible to all network nodes; ii. mobile user's home domain information accessible to all network nodes; iii. mobile user's credential and identification information hierarchical encrypted and only accessible by the intended receivers; iv. authentication challenge and response encrypted and only accessible by parties involved in the mutual authentication; and v. information for message integrity protection.

The 25th aspect of the present invention is the system of protecting the mobile user identification information according to the above configuration, wherein a message format to be used for the WLAN inter-working further comprises: i. information for identifying a key used for the hierarchical encryption to the intended receiver; and ii. information for generating a new key for the identification information protection.

The 26th aspect of the present invention is the system of protecting the mobile user identification information according to the above configuration, that is capable of sharing user's subscription within the WLAN, comprising: i. one or more virtual terminals that are able to access the user's credential and subscription information and carry out the inter-working function as a normal mobile terminal from the inter-worked network; and ii. an apparatus for controlling the service access of the WLAN device to the inter-worked network by the virtual terminal, thereby the virtual terminal is used as a gateway for a WLAN device associated with it to access services provided by the inter-worked network.

The 27th aspect of the present invention is the system of protecting the mobile user identification information according to the above configuration, further comprising: i. a virtual terminal that can access the one or more users' credential and subscription information simultaneously by the virtual terminal; and ii. an apparatus for sharing these one or more users' subscribed services from the inter-worked network in WLAN simultaneously.

The 28th aspect of the present invention is the system of inter-working a WLAN with other networks, comprising: i. a rule engine in the WLAN that would execute rule sets, and control resources allocation in the WLAN accordingly; ii. a rule database and rule server in the network that inter-worked with the WLAN, which would send the rule sets to a rule interpreter; and iii. a rule interpreter in the WLAN that would interpret the rules from the rule server and convert to a WLAN specific action instruction for the rule engine.

The 29th aspect of the present invention is the system of inter-working the WLAN with other networks according to the above configuration, further comprising: i. an apparatus for locally storing the rules in the WLAN; and ii. an apparatus for using default rule sets by the rule interpreter when the rule server is not available or not able to give relevant rules.

The 30th aspect of the present invention is the system of inter-working the WLAN with other networks according to the above configuration, further comprising: i. an apparatus for configuring the translation of the rule at the rule interpreter by sending the rule definition from the rule server; ii. an apparatus for setting a life time range of the rules by including it in the message from the rule server; and iii. an apparatus for modifying a behavior of the rule interpreter and re-deploying by sending new definition and re-deploy message from the rule server.

The 31st aspect of the present invention is the system of inter-working the WLAN with other networks according to the above configuration, for real time status reporting in the WLAN inter-working schemes, further comprising: i. the rule server which specifies the information and the format to be reported from the rule interpreter; the rule interpreter which forms the information in the format set by the rule server from the actual WLAN specific status information; and rule interpreter which is capable of executing commands including mathematical, logical and rule admission control operations form the rule format set by the rule server.

The 32nd aspect of the present invention is the system of inter-working the WLAN with other networks according to the above configuration, further comprising: i. an apparatus for automatically adapting the translation of the rules by the rule interpreter in case of changes in network status and network resource availability in the WLAN; and ii. an apparatus for reporting the adaptation made at the rule interpreter to the rule server.

The 33rd aspect of the present invention is the system of inter-working the WLAN with other networks according to the above configuration, further comprising: i. an apparatus for configuring individual terminal related QoS provisioning in the WLAN from the rule server; and ii. an apparatus for configuring a group of terminals related QoS provisioning in the WLAN from the rule server.

The 34th aspect of the present invention is the system of inter-working the WLAN with other networks according to the above configuration, further comprising: i. an apparatus for configuring individual terminal related traffic routing and mobility information in the WLAN from the rule server; and ii. an apparatus for configuring a group of terminals related to traffic routing and mobility information in the WLAN from the rule server.

The 35th aspect of the present invention is the system of inter-working the WLAN with other networks according to the above configuration, further comprising: i. an apparatus for doing local accounting at the rule engine according to the WLAN specific requirement; ii. an apparatus for managing the rule translation according to the accounting results at the rule interpreter; iii. an apparatus for configuring the accounting report format at the rule interpreter by the rule server; and iv. an apparatus for forming the accounting report in the format set by the rule server from the WLAN specific statistics at the rule interpreter.

The 36th aspect of the present invention is the system of inter-working the WLAN with other networks according to the above configuration, further comprising: i. an apparatus for supporting real-time accounting for pre-paid subscription by setting local accounting criteria at the rule interpreter; and ii. an apparatus for supporting batch accounting by setting accounting rules at the rule interpreter.

The present invention provides a way for protecting the identification information of the mobile user in the message exchange for WLAN inter-working. When it deployed, the messages from the mobile user for access control could be correctly routed to the proper entity without leaking the actual identification information of the user. The present invention also provides a method for managing the key information for the asymmetric cryptography used in identification information protection. With all these, the message exchanges are protected from attacks, especially man-in-the-middle attack.

This invention also includes a method for managing resource controlling in WLAN inter-working by using an interpreter in WLAN. With it applied, the inter-worked network can do the access control of the terminal in WLAN without needing to have the detail technologies knowledge of the WLAN. It also allows the networks to negotiate the way of transferring the information. Also, when it deployed, the WLAN could be configured to do certain local accounting processing, and report only the desired information back to the inter-worked network. This would save the precious signaling bandwidth.

This specification is based on the Japanese Patent Application No. 2002-299569 filed on Oct. 11, 2002, entire content of which is expressly incorporated by reference herein.

INDUSTRIAL APPLICABILITY

The present invention pertains to the field of wireless data communication. More particularly, this invention relates to the provision of service in the wireless LAN environment to the mobile user coming from other networks. It could be used for the inter-working of the WLAN to the public radio networks, e.g. 3G networks, or WLANs using other radio technologies or in another administrative domain. The invention is used for the control of the access of the resource of the WLAN for the mobile users, in particular, the authentication, authorization, and accounting issues. It is also targeted for solving the problems of QoS (Quality of Service) provisioning and mobility support in the inter-working.

FIG. 1
103 INTERMEDIATE SERVER/PROXY
104 HOME DOMAIN SERVER
105 CENTRAL SERVER
106 AIR INTERFACE
107 INTER-WORKING INTERFACE OF WLAN AND OTHER NETWORK
OTHER PROCESS
PROCESSING
FIG. 2
PUBLIC KEY OF AP
PUBLIC KEY OF HOME DOMAIN SERVER
KEY DERIVED FROM SUBSCRIPTION INFORMATION
201 WLAN SPECIFIC LOCAL ID
202 CHALLENGE MESSAGE TO AP
203 EXPECTED RESULT FOR NETWORK CHALLENGE MESSAGE
204 HOME DOMAIN INFO
205 PUBLIC KEY OF MT
206 SPECIFIC USER ID IN HOME DOMAIN
207 NETWORK CHALLENGE MESSAGE
208 PERMANENT USER ID
209 USER DATA
210 SECURITY FIELD
FIG. 3
PUBLIC KEY OF HOME DOMAIN SERVER
KEY DERIVED FROM SUBSCRIPTION INFORMATION
301 AP AND WLAN ADDRESS
302 WLAN SPECIFIC LOCAL ID
303 HOME DOMAIN INFO
304 PUBLIC KEY OF MT
305 SPECIFIC USER ID IN HOME DOMAIN
306 NETWORK CHALLENGE MESSAGE
307 PERMANENT USER ID
308 USER DATA
309 SECURITY FIELD
FIG. 4
KEY DERIVED FROM SUBSCRIPTION INFORMATION
401 HOME DOMAIN INFO
402 NETWORK CHALLENGE MESSAGE
403 SPECIFIC USER ID IN HOME DOMAIN
404 PERMANENT USER ID
405 USER DATA
406 SECURITY FIELD
FIG. 5
KEY DERIVED FROM SUBSCRIPTION INFORMATION
501 HOME DOMAIN INFO
502 SPECIFIC USER ID IN HOME DOMAIN
503 AP RESPONSE KEY
504 NETWORK CHALLENGE MESSAGE RESPONSE FOR AP
505 NETWORK CHALLENGE MESSAGE RESPONSE FOR MT
506 PERMANENT USER ID
507 USER DATA
508 SECURITY FIELD
FIG. 6
PUBLIC KEY OF AP
PUBLIC KEY OF MT
KEY DERIVED FROM SUBSCRIPTION INFORMATION
601 AP AND WLAN ADDRESS
602 WLAN SPECIFIC LOCAL ID
603 AP RESPONSE KEY
604 NETWORK CHALLENGE MESSAGE RESPONSE FOR AP
605 NEW HOME DOMAIN SERVER PUBLIC KEY
606 NETWORK CHALLENGE MESSAGE RESPONSE FOR MT
607 PERMANENT USER ID
608 USER DATA
609 SECURITY FIELD
FIG. 7
PUBLIC KEY OF MT
KEY DERIVED FROM SUBSCRIPTION INFORMATION
701 WLAN SPECIFIC LOCAL ID
702 AP CHALLENGE MESSAGE RESPONSE
703 NETWORK CHALLENGE MESSAGE RESPONSE FOR MT
704 PERMANENT USER ID
705 USER DATA
706 SECURITY FIELD
FIG. 8
104 HOME DOMAIN SERVER
105 CENTRAL SERVER
Msg 1
PUBLIC KEY OF AP
PUBLIC KEY OF HOME DOMAIN SERVER
KEY DERIVED FROM SUBSCRIPTION INFORMATION
WLAN SPECIFIC LOCAL ID
CHALLENGE MESSAGE TO AP
EXPECTED RESULT FOR NETWORK CHALLENGE MESSAGE
HOME DOMAIN INFO
PUBLIC KEY OF MT
SPECIFIC USER ID IN HOME DOMAIN
NETWORK CHALLENGE MESSAGE
PERMANENT USER ID

USER DATA
SECURITY FIELD
Msg 2
PUBLIC KEY OF HOME DOMAIN SERVER
KEY DERIVED FROM SUBSCRIPTION INFORMATION
AP AND WLAN ADDRESS
WLAN SPECIFIC LOCAL ID
HOME DOMAIN INFO
PUBLIC KEY OF MT
SPECIFIC USER ID IN HOME DOMAIN
NETWORK CHALLENGE MESSAGE
PERMANENT USER ID
USER DATA
SECURITY FIELD
Msg 3
KEY DERIVED FROM SUBSCRIPTION INFORMATION
HOME DOMAIN INFO
NETWORK CHALLENGE MESSAGE
SPECIFIC USER ID IN HOME DOMAIN
PERMANENT USER ID
USER DATA
SECURITY FIELD
FIG. 9
105 CENTRAL SERVER
104 HOME DOMAIN SERVER
Msg 4
KEY DERIVED FROM SUBSCRIPTION INFORMATION
HOME DOMAIN INFO
SPECIFIC USER ID IN HOME DOMAIN
AP RESPONSE KEY
NETWORK CHALLENGE MESSAGE RESPONSE FOR AP
NETWORK CHALLENGE MESSAGE RESPONSE FOR MT
PERMANENT USER ID
USER DATA
SECURITY FIELD
Msg 5
PUBLIC KEY OF AP
PUBLIC KEY OF MT
KEY DERIVED FROM SUBSCRIPTION INFORMATION
AP AND WLAN ADDRESS
WLAN SPECIFIC LOCAL ID
AP RESPONSE KEY
NETWORK CHALLENGE MESSAGE RESPONSE FOR AP
NEW HOME DOMAIN SERVER PUBLIC KEY
NETWORK CHALLENGE MESSAGE RESPONSE FOR MT
PERMANENT USER ID
USER DATA
SECURITY FIELD
Msg 6
PUBLIC KEY OF MT
KEY DERIVED FROM SUBSCRIPTION INFORMATION
WLAN SPECIFIC LOCAL ID
AP CHALLENGE MESSAGE RESPONSE
NETWORK CHALLENGE MESSAGE RESPONSE FOR MT
PERMANENT USER ID
USER DATA
SECURITY FIELD
FIG. 10
1001 WLAN APPARATUS
101*a* VIRTUAL TERMINAL
102*a* ACCESS SERVER
103 INTERMEDIATE SERVER/PROXY
104 HOME DOMAIN SERVER
105 CENTRAL SERVER
106 AIR INTERFACE
107 INTER-WORKING INTERFACE OF WLAN AND OTHER NETWORK
WLAN FUNCTION
OTHER PROCESS
PROCESSING
WLAN SPECIFIC PROCESS
WLAN APPARATUS ACCESS TO VIRTUAL TERMINAL'S HOME DOMAIN SERVICE
FIG. 11
106 AIR INTERFACE
107 INTER-WORKING INTERFACE OF WLAN AND OTHER NETWORK
WLAN FUNCTION
801 MOBILE TERMINAL
802 RULE ENGINE (AP)
803 RULE INTERPRETER
804 RULE SERVER
805 BACK-END PROCESSING
INTER-WORKED NETWORK
FIG. 12
WLAN FUNCTION
801 MOBILE TERMINAL
802 RULE ENGINE (AP)
803 RULE INTERPRETER
804 RULE SERVER
OTHER PROCESS
ST 9001 REQUEST
ST 9002 ENQUIRY
ST 9003 LOCAL CACHE CHECK
ST 9005 RULE REQUEST
ST 9006 RULE SEARCH
ST 9007 RULE REPLY
ST 9008 RULE INTERPRETATION
ST 9009 WLAN DECISION
ST 9010 RESPONSE

The invention claimed is:

1. A mobile terminal that performs authentication with a central server through a home domain server, the mobile terminal comprising:
an encrypting section that encrypts a part containing user identification information of the mobile terminal in a message containing the user identification information of the mobile terminal using a key of the central server that performs the authentication of the mobile terminal, and that performs hierarchical encryption of the message containing the encrypted user identification information of the mobile terminal using a key of the home domain server; and
a transmitting section that transmits the message subjected to the hierarchical encryption, to the home domain server.

2. The mobile terminal according to claim 1, wherein the key of the central server is derived from user subscription information.

3. The mobile terminal according to claim 1, wherein the authentication with the central server is performed according to a challenge message response exchange scheme.

4. The mobile terminal according to claim 1, wherein communication with the home domain server is performed according to an asymmetric cryptography scheme.

5. The mobile terminal according to claim 1, wherein:
the user identification information of the mobile terminal encrypted by the encrypting section comprises a permanent user identifier of the mobile terminal; and the encrypting section further comprises a specifying section that, when there are plurality of keys for use in the encryption, specifies a key to encrypt the permanent user identifier.

6. The mobile terminal according to claim 1, wherein the encrypting section further comprises a user identifier generating section that generates a temporal user identifier based on a permanent user identifier of the mobile terminal using a key which is agreed in advance between the mobile terminal and the home domain server.

7. The mobile terminal according to claim 1, further comprising an identification information assigning section that, when there are a plurality of keys of home domain servers for use in the encryption, assigns index information specifying a key for use in the encryption, to network access identification information for use in routing the message to the central server.

8. The mobile terminal according to claim 1, further comprising a key managing section that holds a key which is shared between the central server and the home domain server.

9. A user identification information protection method comprising the steps of:
  encrypting, in an encrypting section, a part containing user identification information of a mobile terminal in a message containing the user identification information of the mobile terminal using a key of the central server that performs authentication of the mobile terminal;
  performing hierarchical encryption of the message containing the encrypted user identification information of the mobile terminal using a key of the home domain server; and
  transmitting the message subjected to the hierarchical encryption, to the home domain server.

10. A home domain server that transfers a message for use in authentication between a mobile terminal and a central server, the home domain server comprising:
  a receiving section that receives from the mobile terminal a message containing user identification information of the mobile terminal subjected to hierarchical encryption;
  a decoding section that decodes the message subjected to the hierarchical encryption using a key of the home domain server; and
  a transferring section that transfers a part containing the user identification information of the mobile terminal of the decoded message to the central server, the part being encrypted with a key of the central server.

11. The home domain server according to claim 10, wherein the transferring section further transfers a message received from the mobile terminal to the central server, the message being used in the authentication according to a challenge message response exchange scheme.

12. A user identification information protection system that performs authentication between a mobile terminal and a central server through a home domain server, the user identification information protection system comprising:
  a mobile terminal that comprises:
    an encrypting section that encrypts a part containing user identification information of the mobile terminal in a message containing the user identification information of the mobile terminal using a key of the central server that performs the authentication of the mobile teuninal, and that performs hierarchical encryption of the message containing the encrypted user identification information of the mobile terminal using a key of the home domain server; and
    a transmitting section that transmits the message subjected to the hierarchical encryption, to the home domain server; and
  the home domain server that comprises:
    a receiving section that receives from the mobile terminal the message containing user identification information of the mobile terminal subjected to the hierarchical encryption;
    a decoding section that decodes the message subjected to the hierarchical encryption using the key of the home domain server; and
    a transferring section that transfers the part containing the user identification information of the mobile terminal of the decoded message to the central server, the part being encrypted with the key of the central server.

* * * * *

UNITED STATES PATENT AND TRADEMARK OFFICE
CERTIFICATE OF CORRECTION

| | | |
|---|---|---|
| PATENT NO. | : 7,945,777 B2 | Page 1 of 1 |
| APPLICATION NO. | : 12/542487 | |
| DATED | : May 17, 2011 | |
| INVENTOR(S) | : Pek Yew Tan et al. | |

It is certified that error appears in the above-identified patent and that said Letters Patent is hereby corrected as shown below:

On the Title Page, Item (12), line 2, incorrectly reads:

"Tando et al"

and should read:

"Tan et al"

On the Title Page, Item (75), Inventors, line 1, incorrectly reads:

"Inventors: Pel Yew Tando, Singapore (SG); Hong"

and should read:

"Inventors: Pek Yew Tan, Singapore (SG); Hong"

On the Title Page, incorrectly omits Item (30), Foreign Application Priority Data, which should read:

"October 11, 2002 (JP)............... 2002-299569"

Claim 12, column 32, line 23, incorrectly reads:

"mobile teuninal, and that performs hierarchical"

and should read:

"mobile terminal, and that performs hierarchical"

Signed and Sealed this
Thirteenth Day of March, 2012

David J. Kappos
*Director of the United States Patent and Trademark Office*